United States Patent
Callahan et al.

(10) Patent No.: US 11,491,854 B2
(45) Date of Patent: Nov. 8, 2022

(54) DEPLOYMENT SYSTEM FOR ROLLING TARP SYSTEMS

(71) Applicant: Tarpstop, LLC, Perrysburg, OH (US)

(72) Inventors: Joseph Callahan, Maumee, OH (US); Justin Bjorum, Wyoming, MI (US); Brent Cottingham, Grand Rapids, MI (US)

(73) Assignee: Tarpstop, LLC, Perrysburg, OH (US)

( * ) Notice: Subject to any disclaimer, the term of this patent is extended or adjusted under 35 U.S.C. 154(b) by 0 days.

(21) Appl. No.: 17/376,541

(22) Filed: Jul. 15, 2021

(65) Prior Publication Data

US 2021/0339611 A1 Nov. 4, 2021

Related U.S. Application Data

(63) Continuation-in-part of application No. 16/982,958, filed as application No. PCT/US2019/023005 on Mar. 19, 2019.

(60) Provisional application No. 62/721,194, filed on Aug. 22, 2018, provisional application No. 62/644,884, filed on Mar. 19, 2018, provisional application No. 63/052,031, filed on Jul. 15, 2020.

(51) Int. Cl.
*B60J 7/12* (2006.01)
*B62D 33/04* (2006.01)

(52) U.S. Cl.
CPC .......... *B60J 7/1204* (2013.01); *B62D 33/04* (2013.01)

(58) Field of Classification Search
CPC .... B62D 33/04; B60P 7/04; B60P 7/02; B60J 7/066; B60J 7/065; B60J 7/064; B60J 7/063; B60J 7/062; B60J 7/061; B60J 7/06; B60J 7/02
USPC .................. 296/105, 100.15, 100.12, 100.11
See application file for complete search history.

(56) References Cited

U.S. PATENT DOCUMENTS

| 8,235,447 | B2 * | 8/2012 | Damsi ....................... B60P 7/02 296/100.18 |
| 8,491,032 | B1 * | 7/2013 | Verduyn .................. B60J 5/065 296/100.12 |
| 9,579,959 | B2 * | 2/2017 | Beshiri ..................... B60J 7/062 |
| 9,809,096 | B1 * | 11/2017 | DeMonte ................. B60J 7/104 |

* cited by examiner

*Primary Examiner* — Joseph D. Pape
(74) *Attorney, Agent, or Firm* — MacMillan, Sobanski & Todd, LLC

(57) ABSTRACT

A rolling tarp deployment system includes a trailer, a bulkhead fixed to the trailer, first and second bows movable along the trailer, first and second tensioning assemblies, and a cover. The first tensioning assembly has a first member secured to the first bow, a second member secured to the bulkhead, and a first actuator configured to engage the first and second members to restrain the first bow to the bulkhead. The second tensioning assembly has a third member secured to the second bow, a fourth member fixed to the trailer, and a second actuator configured to engage the third and fourth members and move the second bow away from the bulkhead. The cover is tensioned when both the first and second members and the third and fourth members are engaged.

12 Claims, 31 Drawing Sheets

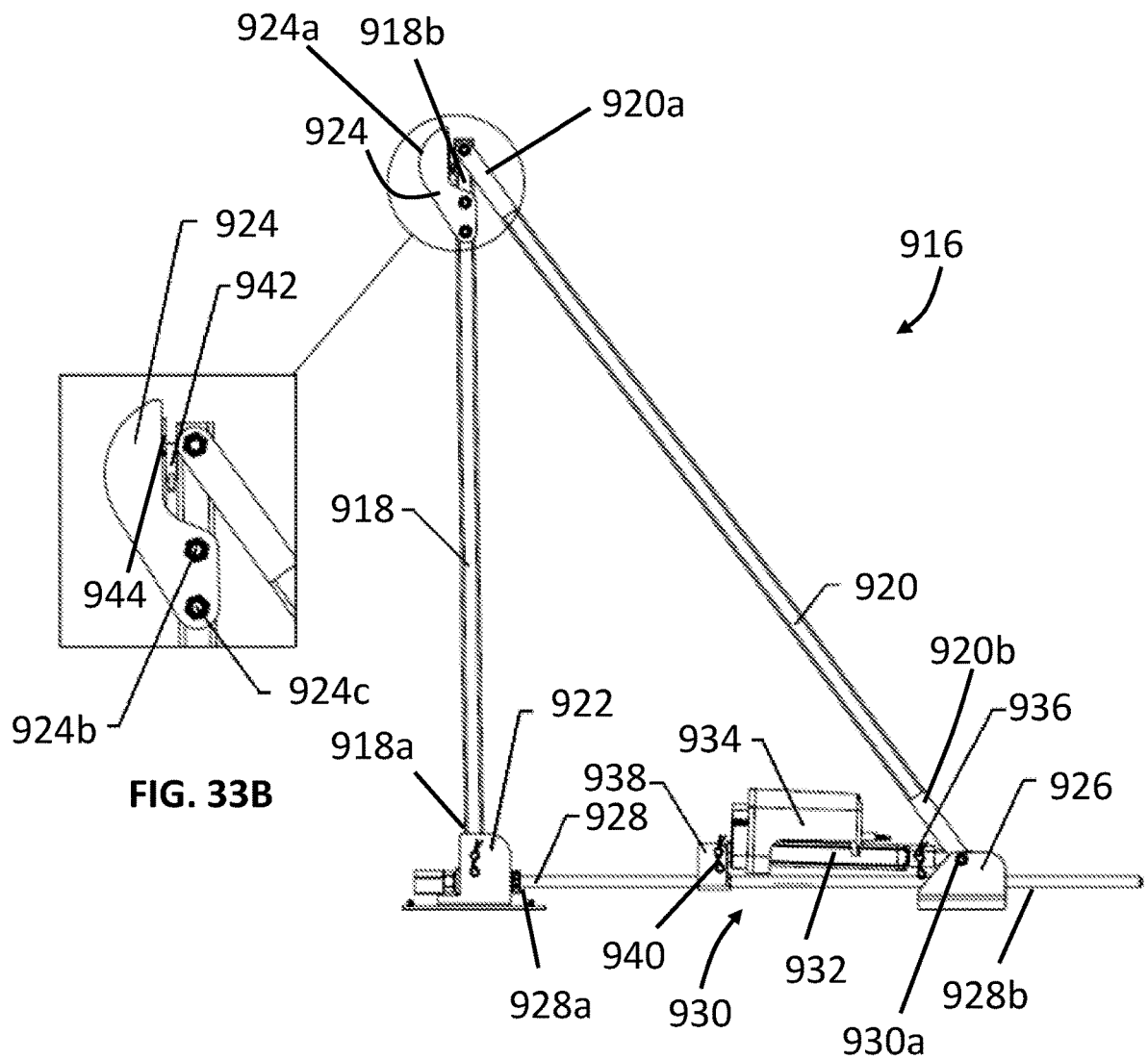

DEPLOYMENT SYSTEM FOR ROLLING TARP SYSTEMS

CROSS REFERENCE TO RELATED APPLICATIONS

This application is a Continuation In Part patent application of U.S. patent application Ser. No. 16/982,958, filed on Sep. 21, 2020, which is the U.S. National Phase application of PCT/US2019/023005, filed Mar. 19, 2019; and further claims the benefit of U.S. Provisional Patent Application 63/052,031, filed Jul. 15, 2020. PCT/US2019/023005 claims the benefit of U.S. Provisional Application No. 62/721,194, filed Aug. 22, 2018, and U.S. Provisional Application No. 62/644,884, filed Mar. 19, 2018. This application further claims the benefit of U.S. Provisional Application No. 63/052,031, filed Jul. 15, 2020. Thus, the subject nonprovisional application claims priority to Mar. 19, 2018. The disclosures of these applications are incorporated herein by reference in their entirety.

BACKGROUND OF THE INVENTION

This invention relates in general to deployment systems for shipping protection systems, and in particular, to a deployment system for a rolling tarp system.

Flatbed trailers are often used to haul loads that are bulky or heavy. These loads often have handling characteristics that rely on access to open sides of the flatbed trailer for loading and unloading. The flatbed trailers provide this open access for handling freight but lack a structure for conveniently covering the loads from weather or for privacy. Thus, tarps are often used to protect freight carried on a flatbed trailer. Sometimes the tarps are applied directly over the loads. Other tarp coverings define an enclosed cargo space and provide access to the cargo therein. One such type of accessible tarp covering is a rolling tarp system that relies on bows and other support structures secured to guide tracks to create a space over the trailer and support one or more tarp sections or sheets.

The rolling tarp systems are operable between a deployed state in which the rolling tarp system is expanded to cover the load on the flatbed trailer and a compressed state in which the rolling tarp system is collapsed to expose the load for access. As discussed, the rolling tarp systems typically comprise a plurality of bows and a tarp section covering and interlinking the bows. Deployment of such a rolling tarp system requires positioning, by rolling on the guide tracks, the bows into position along a length of the flatbed trailer. Once the bows are in position, the tarp section is tensioned until tight on the bows. The positioning of the bows and tensioning of the tarp section are typically manual processes which may not provide an accurate tensioning load to the deployed tarp assembly. When improper tensioning is applied to the tarp system, the outer covering will experience excessive wear and performance degradation. If too little tension is applied, the fabric will flutter or move excessively in response to wind and air forces experienced at highway speeds. This movement creates wear points with the support structure that will cause premature wear or failure of the tarp fabric or the structure. If too much tension is applied, the fabric will stretch over time and may rip or tear out stitching or seam points. In addition, the support structures rely on the tarp tension to prevent excessive movement about joints or attachment points. The time required to perform the positioning and tensioning may delay shipping times and schedules. Thus, it would be desirable to have a more efficient and accurate system for deploying and tensioning the rolling tarp system on the flatbed trailer.

SUMMARY OF INVENTION

This invention relates in general to deployment systems for shipping protection systems. In particular, this invention relates to an improved deployment system for a rolling tarp system. In one aspect, the rolling tarp deployment system includes a flatbed trailer having a deck space configured to accommodate cargo, a bulkhead fixed to the flatbed trailer, first and second bows movable along the flatbed trailer, first and second tensioning assemblies, and a flexible cover. The first tensioning assembly has a first member secured to the first bow, a second member secured to the bulkhead, and a first actuator configured to engage the first and second members to restrain the first bow to the bulkhead. The second tensioning assembly has a third member secured to the second bow, a fourth member fixed to the flatbed trailer, and a second actuator configured to engage the third and fourth members and move the second bow away from the bulkhead. The flexible cover is tensioned by the second bow moving away from the bulkhead when the first and second members are engaged and the third and fourth members are engaged. Motorized roller assemblies are provided for each of the first and second bows. The motorized roller assemblies are configured to move the first and second bows along the flatbed trailer.

In a particular embodiment of this aspect, the first actuator moves the second member to engage the first member and the second actuator moves the fourth member to engage the third member. In a different embodiment of this aspect, the first actuator moves the first member to engage the second member and the second actuator moves the third member to engage the fourth member. Furthermore, this aspect may be provided with a rear cover assembly on the second bow.

In another particular embodiment of this aspect, the second tensioning assembly includes a tensioning A-frame pivotally and slidably secured to the flatbed trailer. The A-frame is moved into and out of engagement with the second bow by an actuator. In one aspect, the actuator is a motor driven, linear actuator that engages an Acme or power screw through a threaded member or actuator base on one end and secured to a sliding and pivoting member of the A-frame on the other end.

Various aspects of this invention will become apparent to those skilled in the art from the following detailed description of the preferred embodiment, when read in light of the accompanying drawings.

BRIEF DESCRIPTION OF THE DRAWINGS

FIG. 33A is an elevation view of an embodiment of the tensioning mechanism of FIG. 31A.

FIG. 33B is an enlarged, elevation view of the engagement portion of the tensioning mechanism of FIG. 33A.

DETAILED DESCRIPTION OF THE PREFERRED EMBODIMENTS

Figure 1:
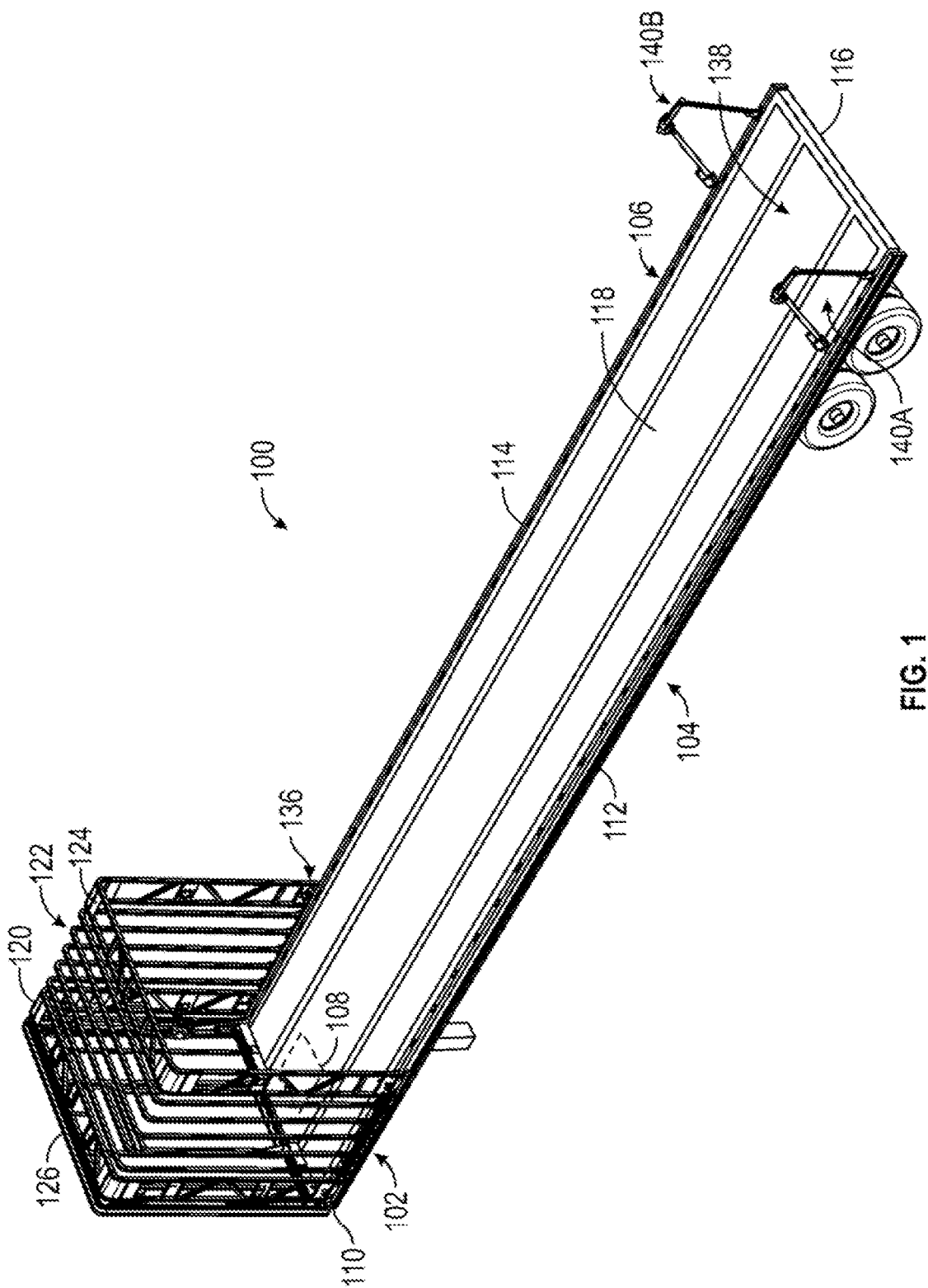
FIG. 1 is a perspective view of a first embodiment of a rolling tarp deployment system in accordance with the invention.

Referring now to FIG. 1, there is illustrated a rolling tarp deployment system, indicated generally at 100, in accordance with a first embodiment of the invention. The deployment system 100 deploys a rolling tarp system, indicated generally at 102. The deployment system 100 is not limited to use with the specific rolling tarp system 102 illustrated. Instead, the deployment system 100 may be used with rolling tarp systems other than the illustrated rolling tarp system 102. As a non-limiting example, the deployment system 100 may be used with the rolling tarp system disclosed in U.S. Pat. No. 9,033,393, the disclosure of which is hereby incorporated herein by reference in its entirety. Typically, the deployment system 100 deploys the rolling tarp system on a transport system, such as a flatbed trailer, indicated generally at 104.

The flatbed trailer 104 is conventional in the art, with a bed portion, indicated generally at 106, and a towing element 108 (shown by hidden lines). As a non-limiting example, the towing element 108 may be a fifth-wheel hitch unit or a trailer hitch receiver. The towing element 108 defines a front portion 110 of the flatbed trailer 104, which may be indicative of a direction in which the flatbed trailer 104 is intended to be towed. Opposing first and second side portions 112 and 114, respectively, and a rear portion 116 of the flatbed trailer 104 are conventionally defined relative to the front portion 110. The bed portion 106 further defines a support or deck surface 118 that forms support for transporting goods or cargo thereon. Although the deployment system 100 is illustrated for use with the flatbed trailer 104, any suitable type of transport system capable of accommodating the rolling tarp system 102 may be used. As non-limiting examples, the deployment system 100 may be used with other transport systems such as a railcar, handcart, or other structure. In certain embodiments, the towing element 108 may be a cab portion of a vehicle, such as a stake or flatbed truck.

In one embodiment, the rolling tarp system 102 includes a plurality of bows including a front bow 120, at least one intermediate bow, indicated generally at 122, and a rear bow 124. The intermediate bows 122 are interlinked or otherwise connected with the front and rear bows 120 and 124, respectively, such that the front, intermediate, and rear bows 120, 122, and 124, respectively, may move together. The front, intermediate, and rear bows 120, 122, and 124, respectively, are collectively deployable between a compressed or collapsed state and a deployed or expanded state. As illustrated in FIG. 1, the front, intermediate, and rear bows 120, 122, and 124, respectively, are in the compressed state on the flatbed trailer 104. In the deployed state, the front, intermediate, and rear bows 120, 122, and 124, respectively, are distributed or otherwise arrayed along a length of the flatbed trailer 104 between the front and rear portions 110 and 116, respectively. A tarp section is typically attached over or between the front, intermediate, and rear bows 120, 122, and 124, respectively. The tarp section may interlink the front, intermediate, and rear bows 120, 122, and 124, respectively. The rolling tarp system 102 also includes a bulkhead 126 attached to the front bow 120. The bulkhead 126 is preferably also fixed to the flatbed trailer 104, typically at the front portion 110 and generally perpendicular to the support surface 118. The bulkhead 126 may be provided or configured differently than as illustrated.

The deployment system 100 includes a front tensioning assembly, indicated generally at 128. The front tensioning assembly 128 includes latch assemblies, indicated generally at 130, a driveline 132 supplying torque to the latch assemblies 130, and a torque generating device 134 supplying the torque to the driveline 132. The front tensioning assembly 128 will be discussed in detail with reference to FIGS. 2-5. The deployment system 100 also includes roller motor assemblies, indicated generally at 136. The roller motor assemblies 136 will be discussed in detail with reference to FIG. 6. The deployment system 100 further includes a rear tensioning assembly, indicated generally at 138. As illustrated, the rear tensioning assembly 138 includes first and second rear tensioning assemblies, indicated generally at 140A and 140B, respectively. The first and second rear tensioning assemblies 140A and 140B, respectively, will be discussed in detail with reference to FIGS. 7-10.

Figure 2:
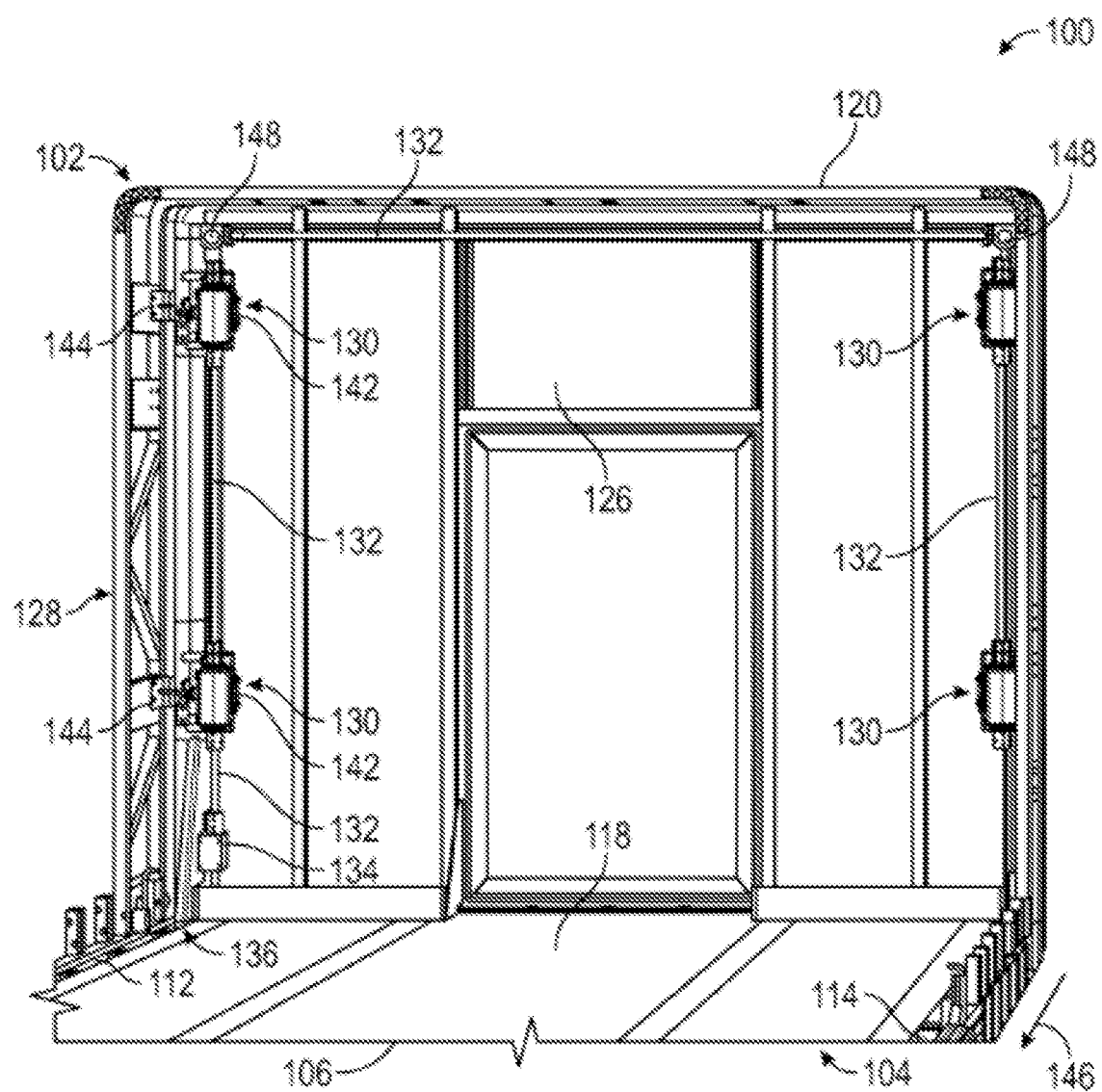
FIGS. 2 and 3 are perspective views of a front tensioning assembly of the rolling tarp deployment system of FIG. 1.
Figure 3:
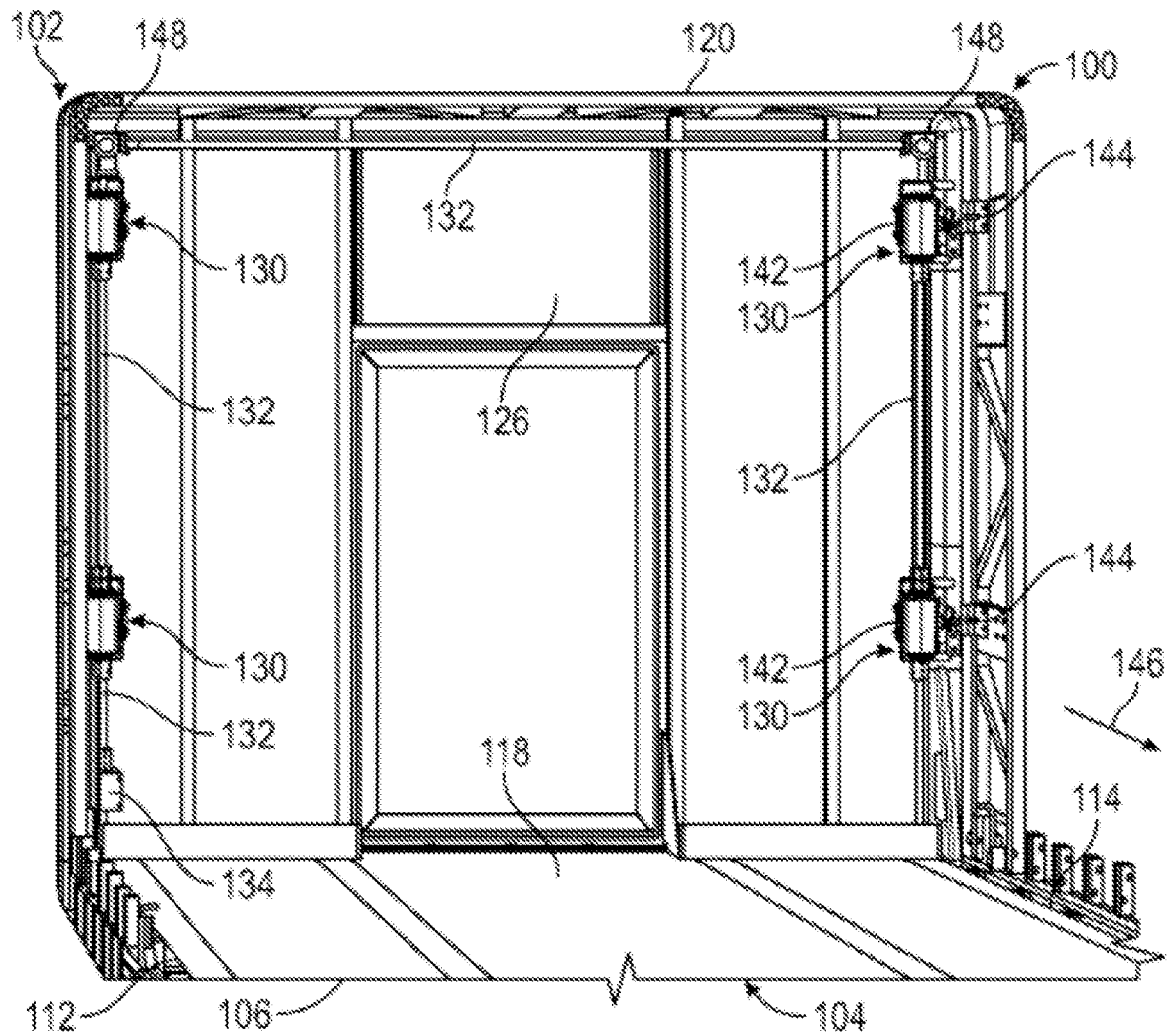

Referring now to FIGS. 2 and 3, the front tensioning assembly 128 is shown in detail. The front tensioning assembly 128 may include more or less than the four latch assemblies 130 illustrated. Each of the latch assemblies 130 comprises first and second latch portions 142 and 144, respectively. The first latch portions 142 are mounted to the bulkhead 126 and the second latch portions 144 are mounted to the front bow 120. The first and second latch portions 142 and 144, respectively, engage together to restrain the front bow 120 from movement in a direction 146 along the length of the flatbed trailer 104 and away from the bulkhead 126 (from the front portion 110 to the rear portion 116 shown in FIG. 1). The latch assemblies 130 will be discussed further with reference to FIGS. 4 and 5.

As discussed, the driveline 132 supplies the torque to the latch assemblies 130 from the torque generating device 134. To supply the torque, the driveline 132 connects each of the latch assemblies 130 to the torque generating device 134. As illustrated, the driveline 132 supplies the torque to the latch assemblies 130 in series. Also, as illustrated, the driveline 132 includes a gearbox 148, having a gear set such as bevel gears, to transmit torque from one side of the front bow 120 to the other. In the illustrated embodiment, the driveline 132 extends between generally vertical and generally horizontal orientations (relative to the support surface 118) by way of the gearboxes 148. Alternatively, the driveline 132 may supply the torque to the latch assemblies 130 via an arrangement other than as illustrated. Alternatively, as a non-limiting example, the driveline 132 may supply the torque to at least some of the latch assemblies 130 via a parallel arrangement or a portion of the driveline 132 to the latch assemblies 130 corresponding to the second side portion 114 of the flatbed trailer 104 may be on an underside of the bed portion 106. Preferably, the driveline 132 includes a threaded screw or worm portion, which may be part of the first latch portion 142 at each of the latch assemblies 130 to supply or transfer the torque from the driveline 132 to the latch assemblies 130. Alternatively, other suitable gearings or drive means may be used for the driveline 132 to transfer the torque to each of the latch assemblies 130.

As discussed, the latch assemblies 130 are linked by the driveline 132. This results in the latch assemblies 130 also being operatively linked. When the torque from the torque generating device 134 is supplied by the driveline 132 to the latch assemblies 130, all of the latch assemblies 130 so supplied are concurrently actuated.

The torque generating device 134 selectively generates and supplies the torque to the driveline 132. The torque generating device 134 preferably generates the torque in opposing directions—e.g., clockwise and counterclockwise. The torque generating device 134 is illustrated as a motor, preferably an electric motor. Alternatively, the torque generating device 134 may be other than the illustrated motor. As a non-limiting example, the torque generating device 134 may be a hand crank, hydraulic motor, pneumatic motor, or other motive device. Furthermore, when the torque generating device 134 is a motor, such as the electric motor, the hand crank may be provided as a backup actuation system.

As illustrated, a single torque generating device 134 supplies the torque to all of the latch assemblies 130. Alternatively, more than one torque generating device 134 may separately provide torque to subgroupings of the latch assemblies 130, wherein the torque is supplied to the subgroupings by separate drivelines 132 or by direct connection to the torque generating devices 134. As a non-limiting example, the latch assemblies 130 corresponding to the first side portion 112 of the flatbed trailer 104 may have torque supplied by a first torque generating device 134 and the latch assemblies 130 corresponding to the second side portion 114 of the flatbed trailer 104 may have torque separately supplied by a second torque generating device 134. Alternatively, each of the latch assemblies 130 may have its own torque generating device 134, such as the electric motor.

Figure 4:
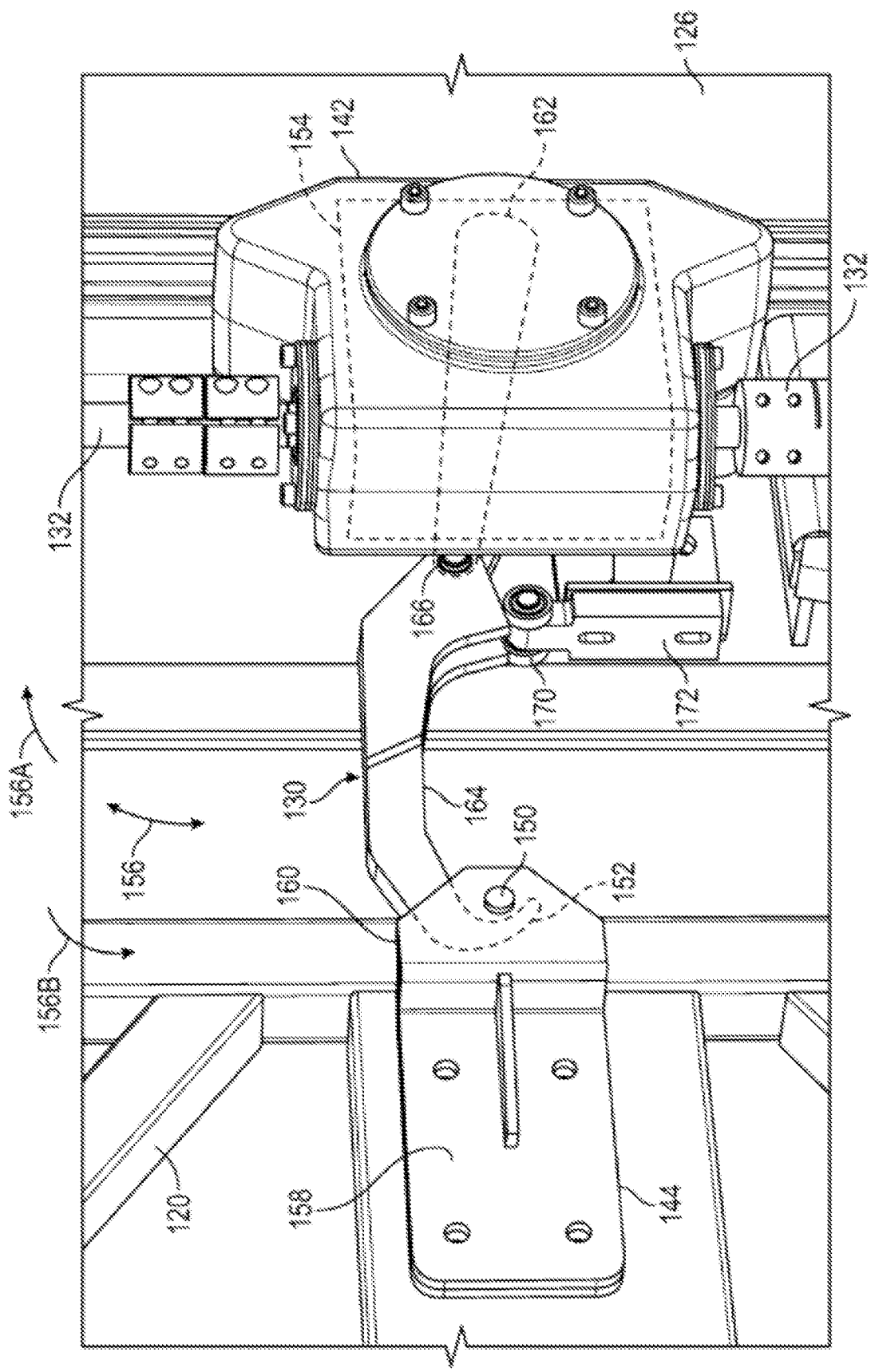
FIGS. 4 and 5 are enlarged perspective views of a latch assembly of the front tensioning assembly of FIGS. 2 and 3.
Figure 5:
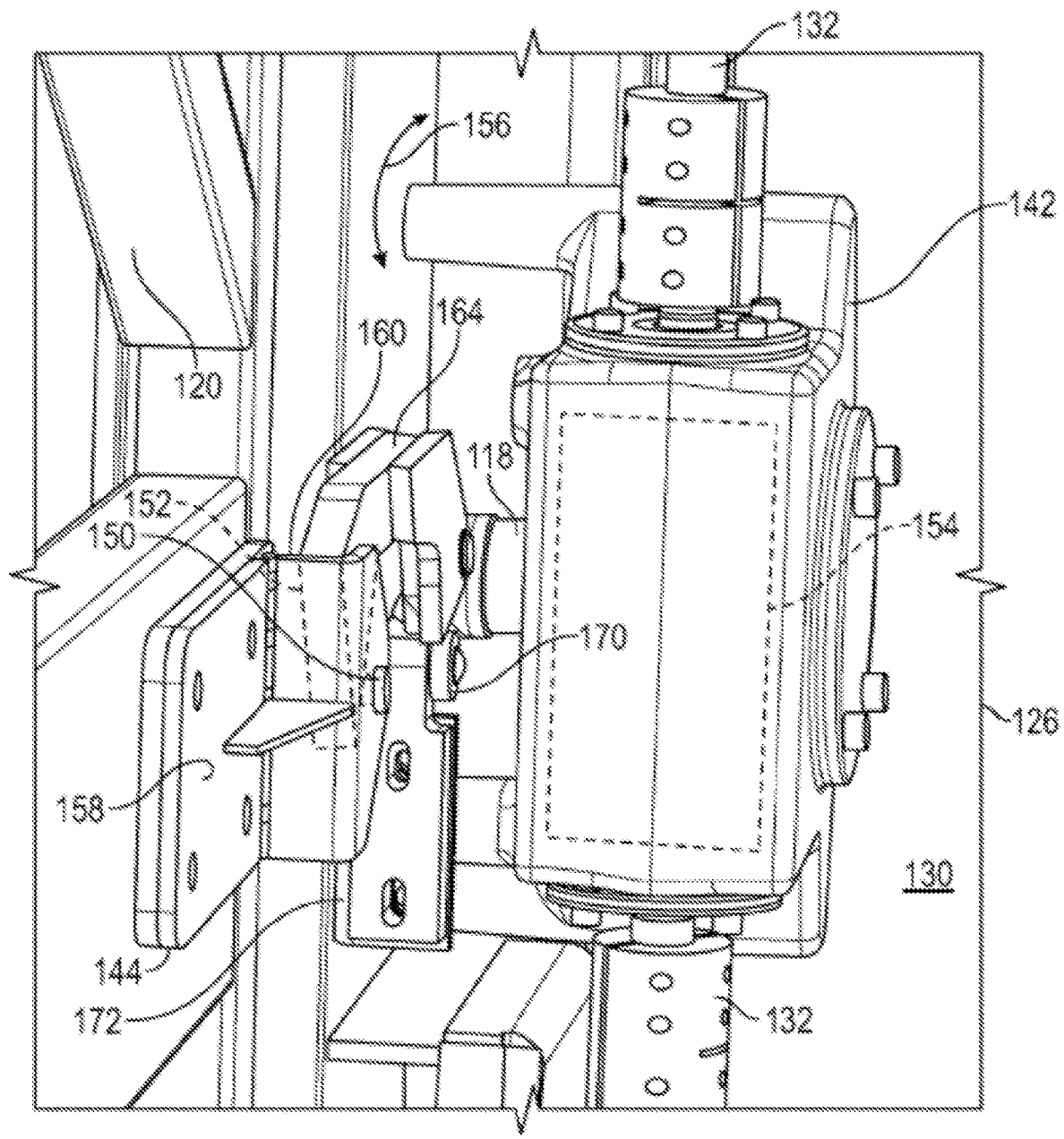

Referring now to FIGS. 4 and 5, the latch assemblies 130 are shown in detail. As illustrated, the first latch portion 142 includes a stop 150, which may be a striker or latch pin structure, and the second latch portion 144 includes an engagement portion 152 (shown by hidden lines as a hook structure) that engages the stop 150. The latch assembly 130 is in a latched state when the stop 150 is engaged with the engagement portion 152 and in an unlatched state when the engagement portion 152 is disengaged from the stop 150. The engagement portion 152 engaging the stop 150 restrains the front bow 120 from movement away from the bulkhead 126 in the direction 146. As illustrated, the stop 150 is a pin or bar and the engagement portion 152 is a rotating hook. Alternatively, the stop 150 may be other than the illustrated pin and the engagement portion 152 other than the illustrated rotating hook to restrain the front bow 120 from movement away from the bulkhead 126 in the direction 146.

The first latch portion 142 includes an actuator gearing 154 (shown by hidden lines). Preferably, the actuator gearing 154 includes a reduction gearing, such a worm and sector gear set, bevel gear set, or other angled drive element. As a non-limiting example, the reduction gearing may be a 60:1 gear reduction. As shown in FIGS. 4 and 5, the actuator gearing 154 diverts a portion of the torque supplied by the driveline 132 to move the hook 152 into and out of engagement with the latch pin 152. As will be discussed, the actuator gearing 154 uses the torque supplied by the driveline 132 to rotate the engagement portion 152 along an arc 156 to engage and disengage the stop 150. The second latch portion 144 has an attachment portion or mounting flange 158 and a pocket portion 160. The attachment portion 158 is mounted to the front bow 120. The pocket portion 160 guides and receives the engagement portion 152 and the stop 150 spans across the pocket portion 160. Alternatively, such as when the stop 150 is other than the illustrated pin, the pocket portion 160 may be other than as illustrated or omitted.

As illustrated, the engagement portion 152 has first and second arms 162 and 164, respectively. The first arm 162 is rotationally connected to the actuator gearing 154 and the second arm 164 engages the stop 150. The first and second arms 162 and 164, respectively, are connected by a pin connection 166 that allows relative rotation between the first and second arms 162 and 164, respectively. An input end 168 of the first arm 162 rotates with the actuator gearing 154 but is otherwise restrained from moving. The second arm 164 is supported by a roller 170. The roller 170 is supported by a roller bracket 172 that is mounted to the bulkhead 126. Alternatively, the engagement portion 152 may be other than as illustrated.

When the actuator gearing 154 rotates the input end 168 in a first direction 156A along the arc 156, the first arm 162 also rotates in the first direction 156A, and the second arm 164 rotates in a second direction 156B along the arc 156. When the front bow 120 is positioned sufficiently close to the bulkhead 126 (such as when the rolling tarp system 102 is in the collapsed state), rotation of the second arm 164 in the second direction 156B engages the engagement portion 152 with the stop 150. When the actuator gearing 154 rotates the input end 168 in the second direction 156B, the first arm 162 also rotates in the second direction 156B, the second arm 164 rotates in the first direction 156A, and the engagement portion 152 disengages from the stop 150. As the second arm 164 rotates, the pin connection 166 is displaced along the arc 156 and the second arm 164 rolls on the roller 170.

Figure 6:
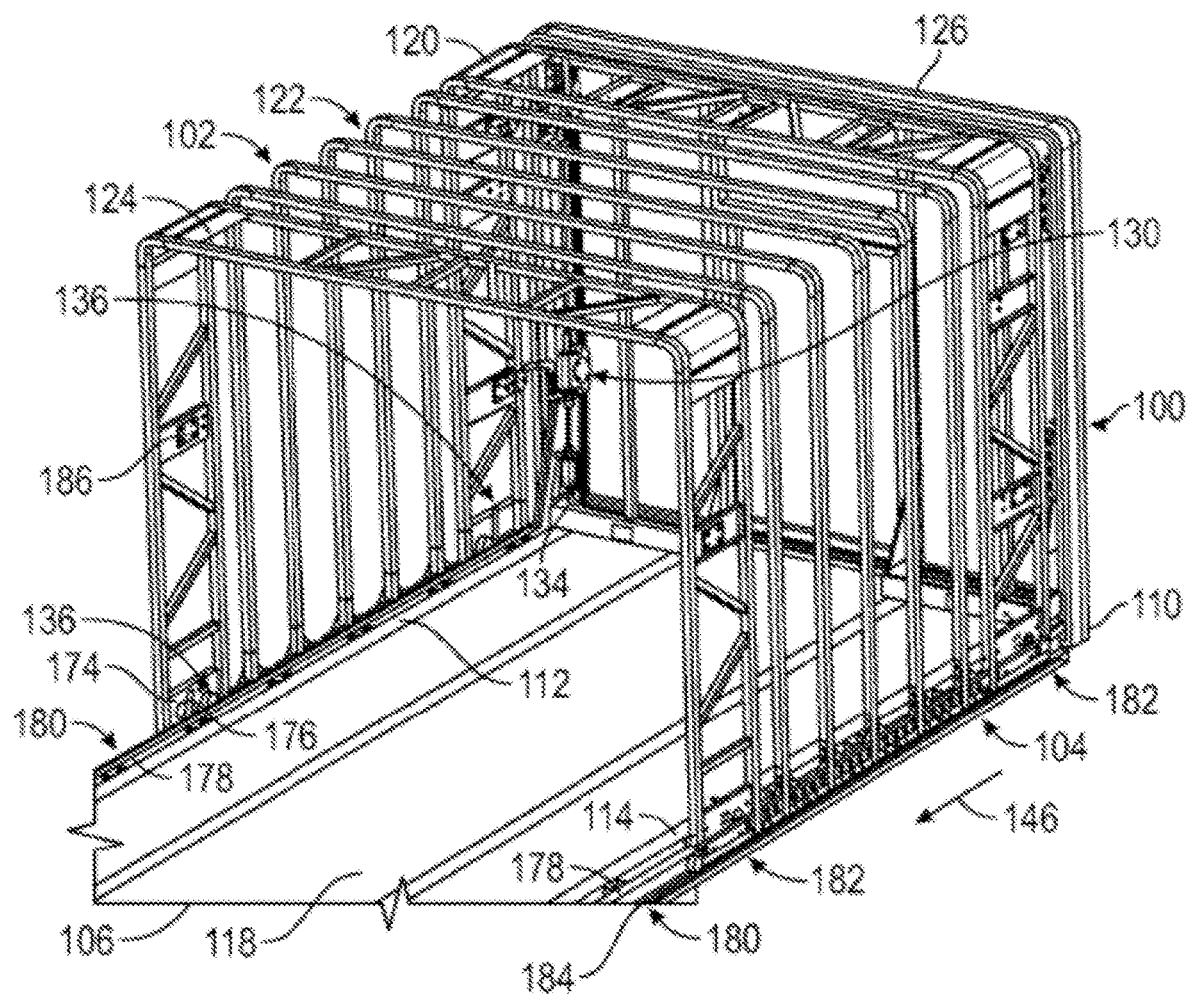
FIG. 6 is a perspective view showing a motorized roller assembly of the rolling tarp deployment system of FIG. 1.

Referring now to FIG. 6, the roller motor assemblies 136 are shown. As illustrated, the roller motor assemblies 136 are provided for the front and rear bows 120 and 124, respectively, although the roller motor assemblies 136 may alternatively be provided for any bow of the rolling tarp system 102 or in a configuration other than as illustrated. As a non-limiting example, the roller motor assemblies 136 may be provided for a combination of the front, intermediary, and rear bows 120, 122, and 124, respectively.

Each of the roller motor assemblies 136 has a motor 174 and a roller 176. Preferably, the motor 174 is an electric motor. When the motor 174 is an electric motor, each of the roller motor assemblies 136 further includes a battery or other power source (such as an electrical harness connection from a common power supply source) for the motor 174.

The motor 174 selectively rotates the roller 176 in opposing directions—e.g., clockwise and counterclockwise. The roller 176 bears on a top surface 178 of a guide track assembly 180 of the rolling tarp system 102. Each of the first and second side portions 112 and 114, respectively, of the flatbed trailer 104 has one of the guide track assemblies 180 extending between the front and rear portions 110 and 116, respectively. The guide track assembly 180 also supports roller assemblies 182 of the rolling tarp system 102. The roller assemblies 182 are supported on an inner surface 184 of the guide track assemblies 180. Each of the front, intermediate, and rear bows 120, 122, and 124, respectively, has a pair of the roller assemblies 182, one of which corresponds to each of the first and second side portions 112 and 114, respectively.

As the rolling tarp system 102 deploys along the flatbed trailer 104, the roller assemblies 182 of the front, intermediate, and rear bows 120, 122, and 124, respectively, roll on the inner surface 184 of the guide track assemblies 180. The roller motor assemblies 136 propel the roller assemblies 182 of the front and rear bows 120 and 124, respectively, along the inner surface 184 by the motors 174 driving the rollers 176 along the top surface 178. It should be understood that the roller assemblies 182 and rollers 176 may engage any suitable portion of the guide track assemblies 180, other than as specifically described above, to move the bows along the trailer 104. The intermediate bows 122 are propelled by the interlinking of the intermediate bows 122 with the front and rear bows 120 and 124, respectively—i.e., the roller motor assemblies 136 on front and rear bows 120 and 124, respectively, push and/or pull the intermediate bows 122 via the interlinking (such as by the tarp sheet, cables, bendable or jointed link elements, or other interlinking structures).

As a non-limiting example, when the rolling tarp system 102 is deployed or otherwise expanded from the position illustrated in FIG. 6, the roller motor assemblies 136 propel the rear bow 124 in the direction 146. The rear bow 124 is propelled in the direction 146 by the motor 174 driving the roller 176 on the top surface 178. The rear bow 124 then pulls, one by one as slack in the tarp section is taken up, the intermediate bows 122 in the direction 146. The roller motor assemblies 136 propel the rear bow 124 to a position proximate to the rear tensioning assembly 138 for tensioning of the tarp section. Tensioning of the tarp section will be discussed with reference to FIGS. 9A-10. As a further non-limiting example, when the rolling tarp system 102 is returned or otherwise collapsed to the position illustrated in FIG. 6, the roller motor assemblies 136 propel the rear bow 124 opposite to the direction 146. Again, the rear bow 124 is propelled opposite to the direction 146 by the motor 174 driving the roller 176 on the top surface 178. The rear bow 124 then pushes, one by one as slack is restored, the intermediate bows 122 opposite to the direction 146.

Figure 7:
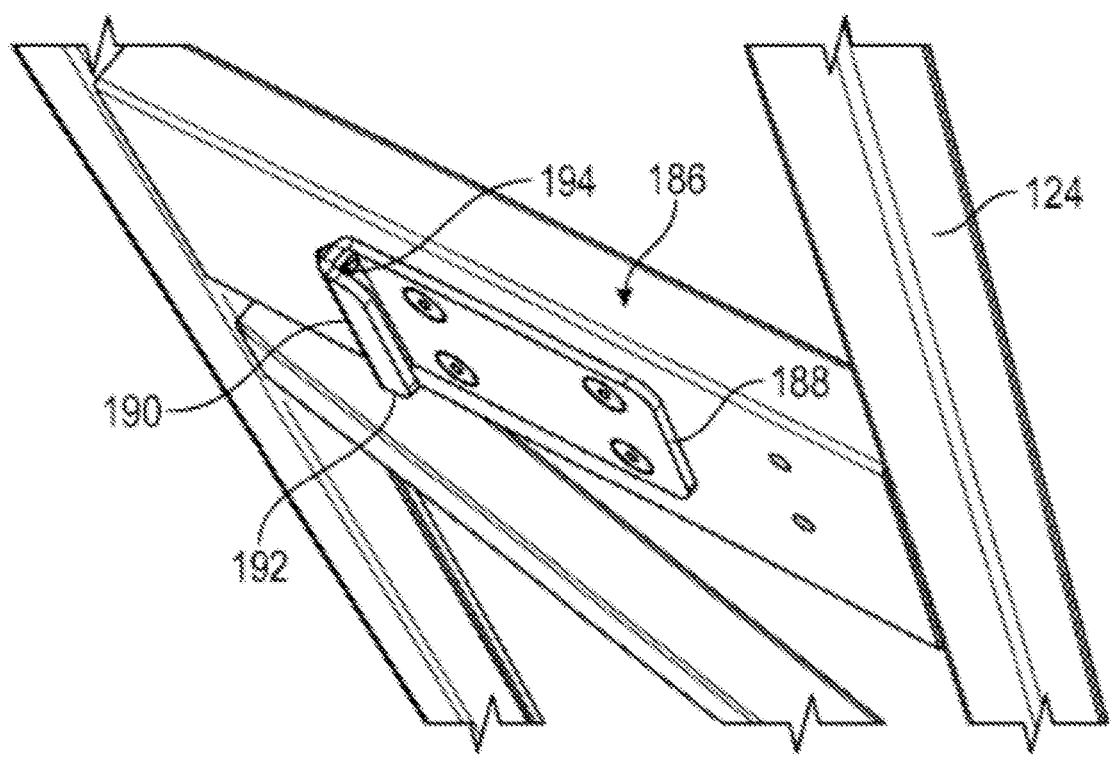
FIG. 7 is a perspective view of a first portion of a rear tensioning assembly of the rolling tarp deployment system of FIG. 1.

Referring now to FIG. 7, there is illustrated a tensioning receiver, indicated generally at 186, for the first and second rear tensioning assemblies 140A and 140B, respectively. The tensioning receiver 186 comprises an attachment portion or mounting flange 188 and a pocket portion 190. The attachment portion 188 mounts the tensioning receiver 186 to the rear bow 124. FIG. 7 illustrates the tensioning receiver 186 mounted to the rear bow 124 at a first location corresponding to the first side portion 112 of the flatbed trailer 104. A second tensioning receiver 186 is also mounted to the rear bow 124 at a second location corresponding to the second side portion 114 of the flatbed trailer 104. The two tensioning receivers 186 are positioned on opposite sides of the rear bow to engage with first or second rear tensioning assembly 140A and 140B of FIG. 8, as will be described below. As illustrated, the pocket portion 190 has a U-shaped cross section extending in a vertical direction. Alternatively, the pocket portion 190 may have a cross section other than as illustrated. A pocket leg 192 of the pocket portion 190 provides lateral stability to the latched bow system, such as the rear bow, when the tensioning assemblies 140A and 140B are engaged. The pocket portion 190 further includes a first contact surface 194. As illustrated, the first contact surface 194 is a flat or otherwise planar surface mounted within the pocket portion 190, though any other suitable shape may be provided, and may further be removable from the tensioning receiver 186. In one embodiment, the first contact surface may be an elastomeric bumper or a hardened wear plate. Alternatively, the first contact surface 194 may be a non-removable surface of the tensioning receiver 186. As will be discussed further, the first contact surface 194 is contacted by the first or second rear tensioning assembly 140A or 140B, respectively.

Figure 8:
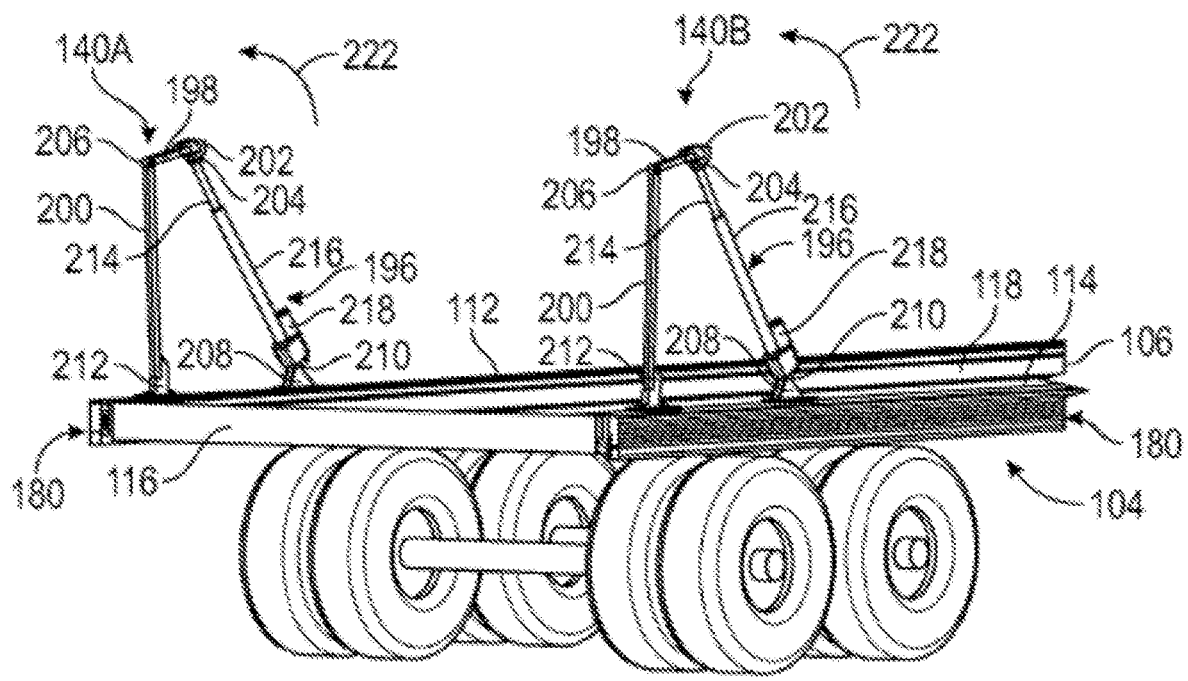
FIG. 8 is a perspective view of a second portion of the rear tensioning assembly.
Figure 9:
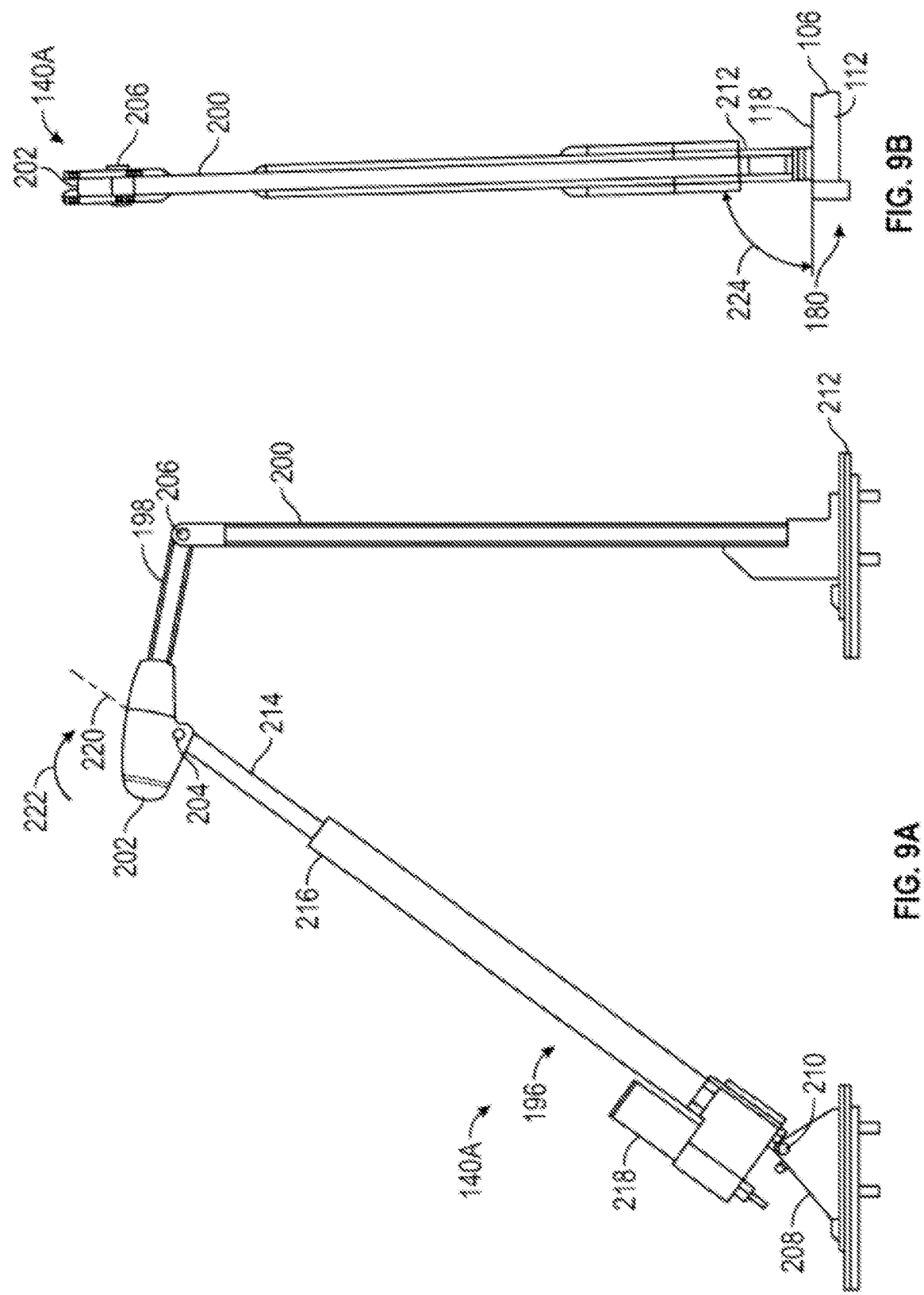
FIGS. 9A and 9B are elevation views of the second portion of the rear tensioning assembly in a first position.

Referring now to FIGS. 8-9B, the first and second rear tensioning assemblies 140A and 140B, respectively, are illustrated in detail. Discussion of one of the first or second rear tensioning assemblies 140A or 140B, respectively, applies to the other of the first or second rear tensioning assemblies 140A or 140B, respectively, unless otherwise noted. Each of the first and second rear tensioning assemblies 140A and 140B, respectively, has a linear actuator, indicated generally at 196, a top link 198, and a rear link 200. The top link 198 has a second contact surface 202 configured to engage with the first contact surface 194 of the pocket portion 190. As illustrated, the second contact surface 202 is an arcuate surface, though other shapes may be used. In addition, the second contact surface 202 may have tapering sides that can engage or provide a wedging or lateral stabilizing effect with mating surfaces of the pocket leg 192 and the mounting flange or attachment portion 188 A first pivot connection 204 connects the linear actuator 196 and the top link 198 while allowing rotational movement between the linear actuator 196 and the top link 198. Similarly, a second pivot connection 206 connects the top link 198 and the rear link 200 while allowing rotational movement between the top link 198 and the rear link 200.

A pivot assembly 208 connects the linear actuator 196 to the flatbed trailer 104. The pivot assembly 208 is rotationally fixed to the bed portion 106 of the flatbed trailer 104 and a pivot connection 210 connects the linear actuator 196 and the pivot assembly 208 while allowing rotation of the linear actuator 196 relative to the pivot assembly 208. A mounting assembly 212 rigidly connects the rear link 200 to the flatbed trailer 104. The mounting assembly 212 is rotationally fixed to the rear link and relative to the bed portion 106. The rear link 200 is restrained by the mounting assembly 212 from movement, such as linear movement along the trailer and fixed in at least the plane defined by the support surface 118 of the bed portion 106.

The linear actuator 196 includes first and second linear actuator portions 214 and 216, respectively. As a non-limiting example, the linear actuator 196 may be a ball screw. The first linear actuator portion 214 is selectively actuated—e.g., rotated—by an actuator 218, such as a motor and gearbox assembly, to extend or retract relative to the second linear actuator portion 216 along a linear actuator axis 220, such as in a telescoping manner. Preferably, the actuator 218 is an electric motor. Alternatively, the actuator 218 may be a hydraulic or pneumatic cylinder. As will be discussed, as the first linear actuator portion 214 extends or retracts relative to the second linear actuator portion 216, the top link 198 rotates along an arc 222. When the first linear actuator portion 214 extends from the second linear actuator portion 216, the top link 198 moves along the arc 222 towards the rear portion 116 of the flatbed trailer 104. When the first linear actuator portion 214 retracts into the second linear actuator portion 216, the top link 198 moves along the arc 222 away from the rear portion 116 (and towards the front portion 110 of the flatbed trailer 104).

As illustrated, the first and second rear tensioning assemblies 140A and 140B, respectively, extend upwardly from the bed portion 106. The first and second rear tensioning assemblies 140B and 140B, respectively, are at an angle 224 from the support surface 118, wherein the illustrated angle 224 is less than 90°. Preferably, the illustrated angle 224 is 88°. The first and second rear tensioning assemblies 140B and 140B may extend at an acute or obtuse angle or at a right angle from the trailer bed 106, if desired.

Figure 10:
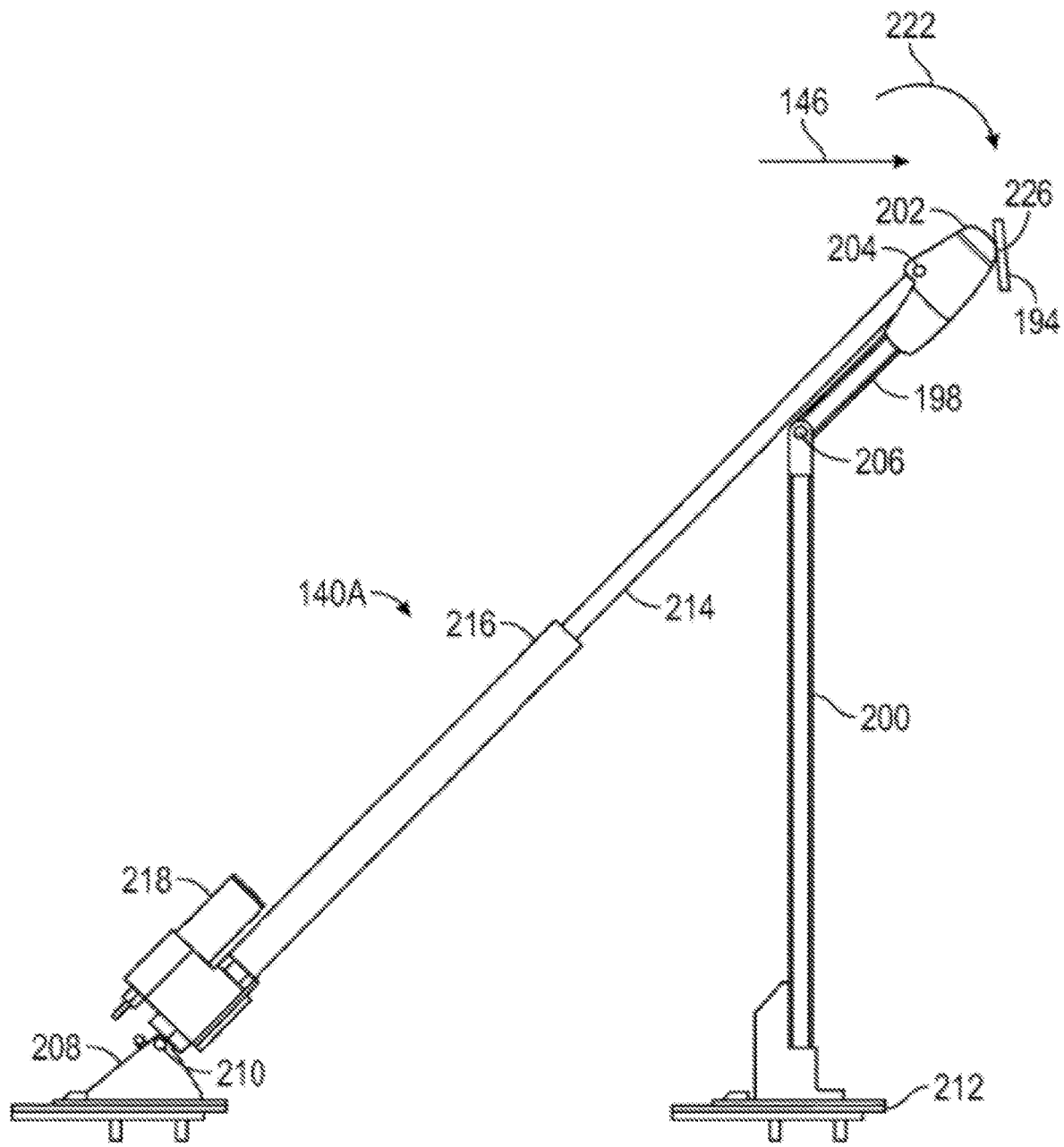
FIG. 10 is an elevation view of the second portion of the rear tensioning assembly of FIGS. 9A and 9B in a second position.

Referring now to FIGS. 9A and 10, operation of the first and second rear tensioning assemblies 140A and 140B, respectively, will be discussed. FIG. 9A illustrates the first rear tensioning assembly 140A in a first position, which is a non-tensioning, or release position. FIG. 10 illustrates the first tensioning assemblies 140A in a second position, which is a tensioning, locked or applied position. When the rolling tarp system 102 is in the compressed position, or other than fully in the deployed position, the first and second rear tensioning assemblies 140A and 140B, respectively, are preferably in the first position. When the rolling tarp system 102 is fully in the deployed position, the first and second rear tensioning assemblies 140A and 140B, respectively, are in the second position. The first and second rear tensioning assemblies 140A and 140B, respectively, selectively move between the first and second positions by the linear actuator 196 displacing the top link 198 along the arc 222.

In the second position illustrated in FIG. 10, the linear actuator 196 has displaced the top link 198 along the arc 222 such that the second contact surface 202 is in contact with and bears upon the first contact surface 194 of the tensioning receiver 186. Because the first contact surface 194 is a flat surface and the second contact surface 201 is an arcuate surface, the contact between the first and second contact surfaces 194 and 202, respectively, is a tangential contact point 226. The tangential point of contact permits contact between the two components at a discrete point which may be at a variable position along the first and second contact surfaces 194 and 202. This variable location of the contact point absorbs tolerances associated with the rolling tarp and trailer structures. Alternatively, the tangential contact point 226 may be provided by the first contact surface 194 being arcuate and the second contact surface 202 being flat or otherwise planar. It should be understood that other geometries capable of generating a variable contact point between two contacting surfaces may be used for the first and second contacting surfaces 194 and 202 and remain within the scope of the invention. The first and second rear tensioning assemblies 140A and 140B, respectively, develop a tensioning force in the direction 146 to displace, push, press, or otherwise move the rear bow 124 in the direction 146. The tangential contact point 226 between the first and second contact surfaces 194 and 202, respectively, limits the tensioning force developed by the first and second rear tensioning assemblies 140A and 140B, respectively, to the direction 146 in the plane defined by the support surface 118—i.e., the tensioning force is generally parallel to the support surface 118. This avoids or reduces subjecting the bow support structure to off-axis or non-tensioning loads which cause wear.

To deploy the rolling tarp system 102 on the flatbed trailer 104, the front tensioning assembly 128 is operated to latch the front bow 120 to the bulkhead 126. Then, the rear bow 124 is propelled to the rear portion 116 of the flatbed trailer 104 by the roller motor assemblies 136, which in turn moves the intermediate bows 122 along the length of the trailer. When the rear bow 124 is at the rear portion 116, the first and second rear tensioning assemblies 140A and 140B, respectively, are actuated to displace the rear bow 124 further in the direction 146 while the front tensioning assembly 128 restrains the front bow 120 from movement in the direction 146. This tensions the tarp section or tarp sheet of the rolling tarp system 102 and places the rolling tarp system 102 in the deployed state.

To compress or otherwise retract the rolling tarp system 102, the first and second rear tensioning assemblies 140A and 140B, respectively, are operated to be released or otherwise not displace and tension the rear bow 124 in the direction 146, the roller motor assemblies 136 propel the rear bow 124 from the rear portion 116 to the front portion 110, and the front tensioning assembly 128 is operated to unlatch the front bow 120 from the bulkhead 126. As discussed, the rear bow 124 is moved by the roller motor assemblies 136. Alternatively, the rear bow 124 may be moved by other than the roller motor assemblies 136, such as during a loss of power or a malfunction, where the rear bow 124 may be manually moved on the flatbed trailer 104.

As described, the deployment system 100 is arranged on the flatbed trailer 104 such that the front tensioning assembly 128 is at the front portion 110 of the flatbed trailer 104 and the rear tensioning assembly 138 is at the rear portion 116 of the flatbed trailer 104. Alternatively, the front tensioning assembly 128 may be at the rear portion 116 and the rear tensioning assembly 138 may be at the front portion 110.

Referring now to FIGS. 11-14, there is illustrated a second embodiment of a rolling tarp deployment system, indicated generally at 300, in accordance with the invention. The roller tarp deployment system 300 is for a roller tarp system and is a variation of the deployment system 100 previously discussed with reference to FIGS. 1-10. As such, like reference numerals, incremented by 200, designate corresponding parts in the drawings and detailed description thereof will be omitted.

Figure 11:
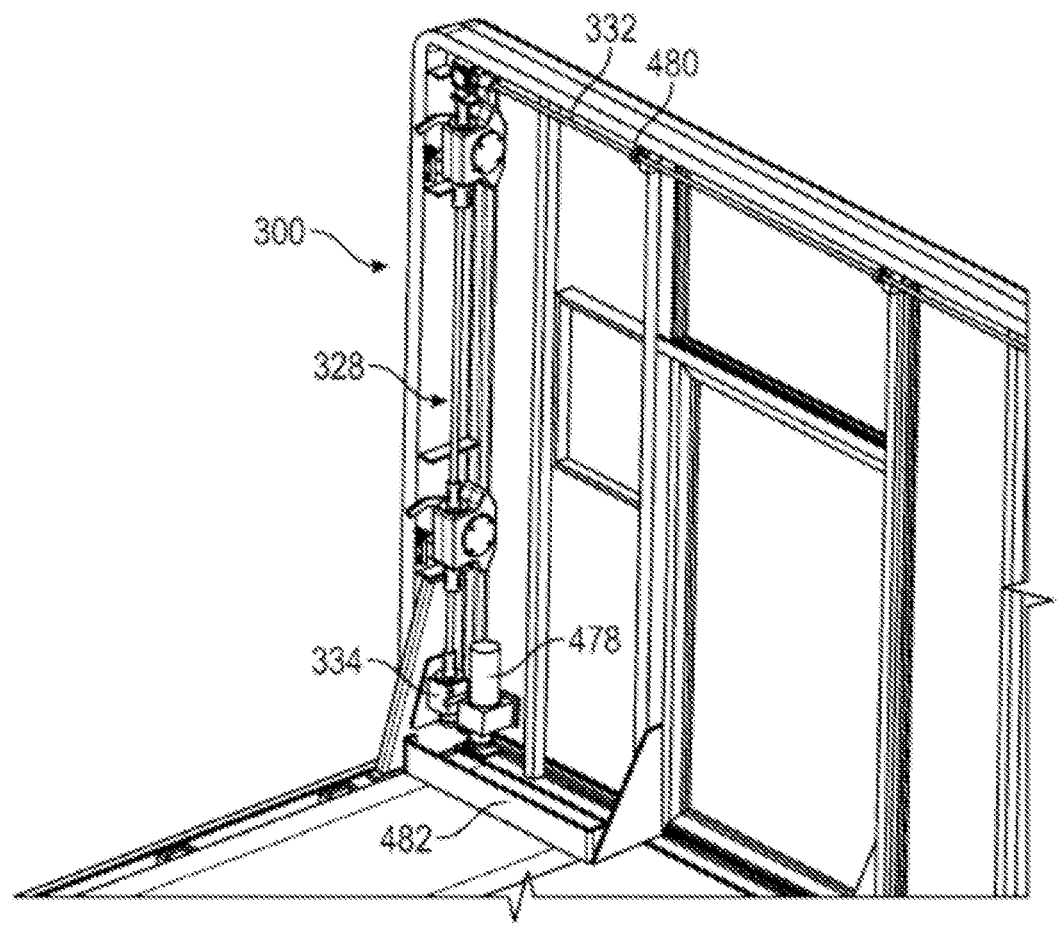
FIGS. 11 and 12 are perspective views of a front tensioning assembly of a rolling tarp deployment system in accordance with a second embodiment of the invention.
Figure 12:
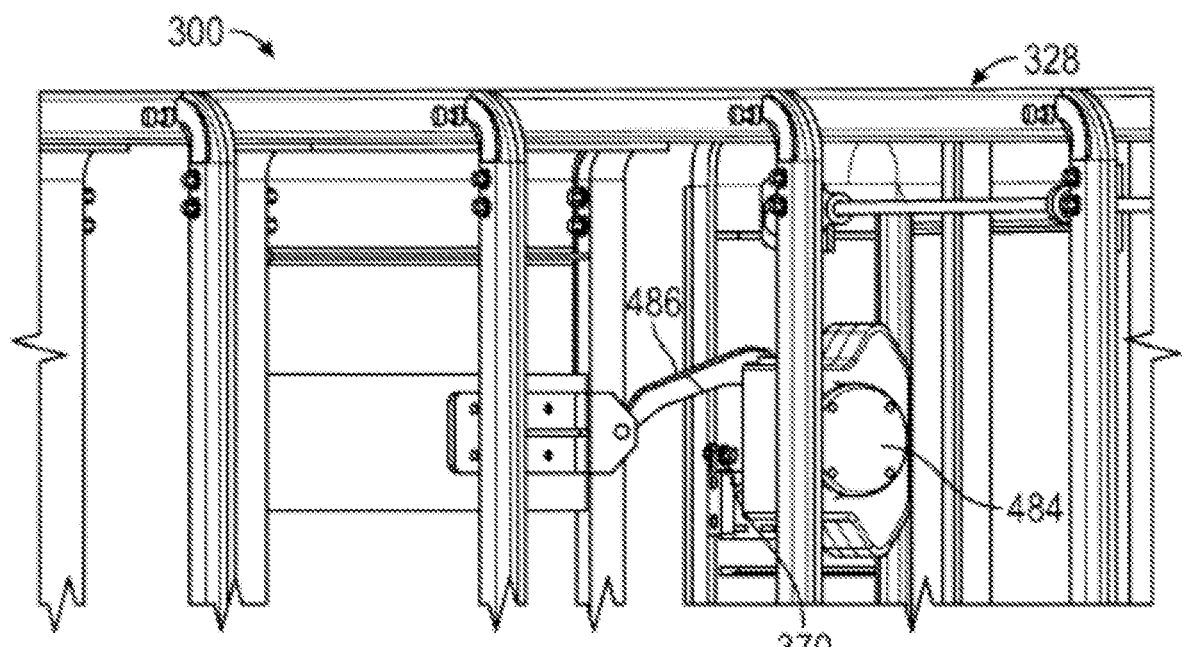

Referring specifically to FIG. 11, a torque generating device 334 of a front tensioning assembly 328 includes an electric motor 478 which may also include a gearbox. A driveline 332 is supported by support brackets 480, which may be pillow block bearings or bushings if desired. One or more guard portions 482 restrain any load or cargo from contacting the front tensioning assembly 328. Referring specifically to FIG. 12, a latch assembly 484, which may be a worm and sector gearbox drive, has an arm 486. In a latched state of the latch assembly 484, shown in FIG. 12, the arm 486 engages a hook end similar to the hook 152 into and out of engagement with a corresponding latch pin or striker, similar to the latch pin 152.

Figure 13:
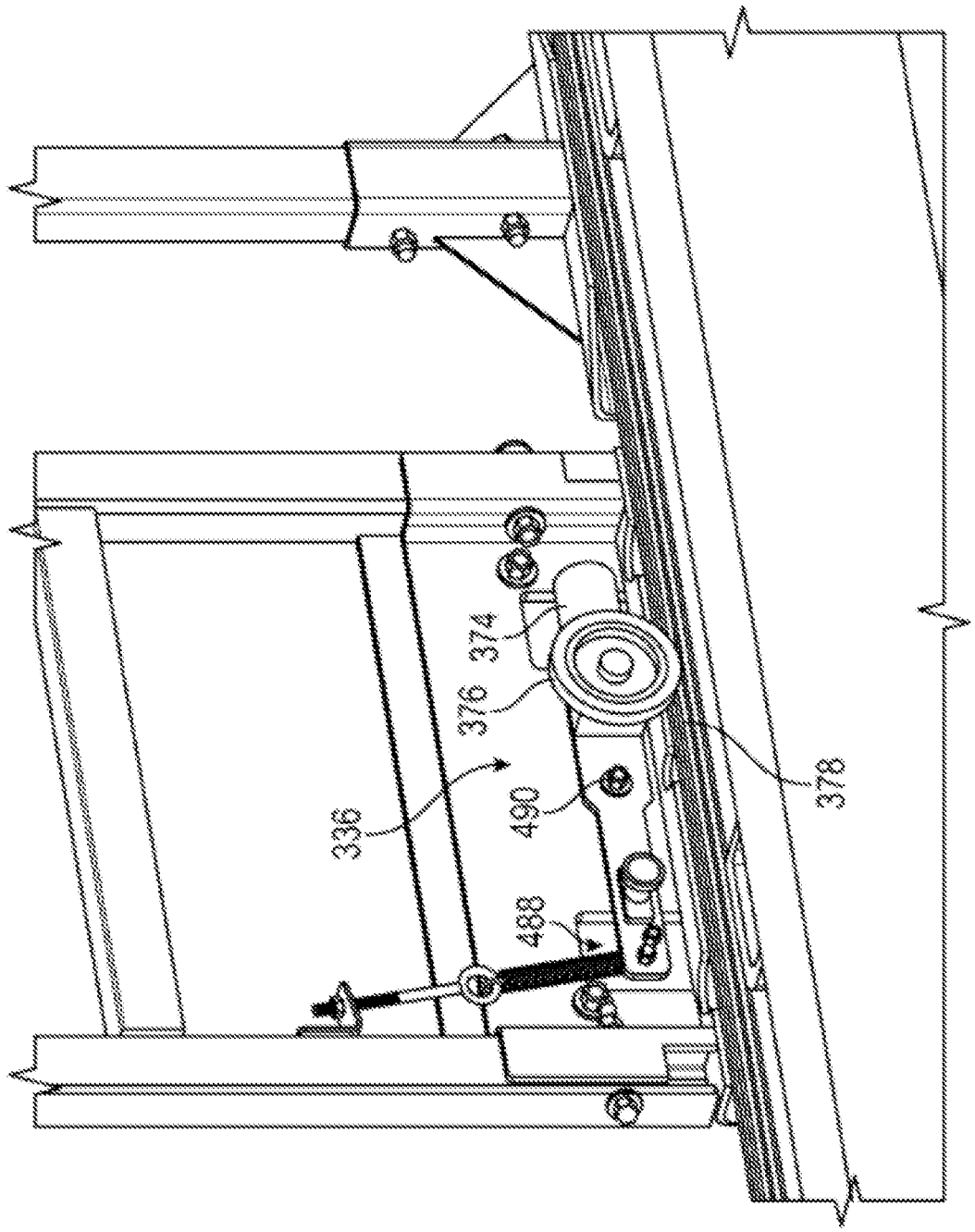
FIG. 13 is a perspective view of a motorized roller assembly for the rolling tarp deployment system in accordance with the second embodiment of the invention.

Referring specifically to FIG. 13, there is a roller motor assembly, indicated generally at 336, of the deployment system 300. The roller motor assembly 336 has a spring assembly, indicated generally at 488. The spring assembly 488 maintains contact between the roller motor assembly 336 and a top surface 378 of a track assembly. The spring assembly 488 provides damping for the roller motor assembly 336 and may also provide contact pressure sufficient for a motor 374 to drive a roller 376 against the track surface. The roller motor assembly 336 is mounted to a bow of the rolling tarp system—e.g., a front bow or a rear bow—by a connection 490. Preferably, the connection 490 allows rotational movement of the roller motor assembly 336 about the connection 490.

Figure 14:
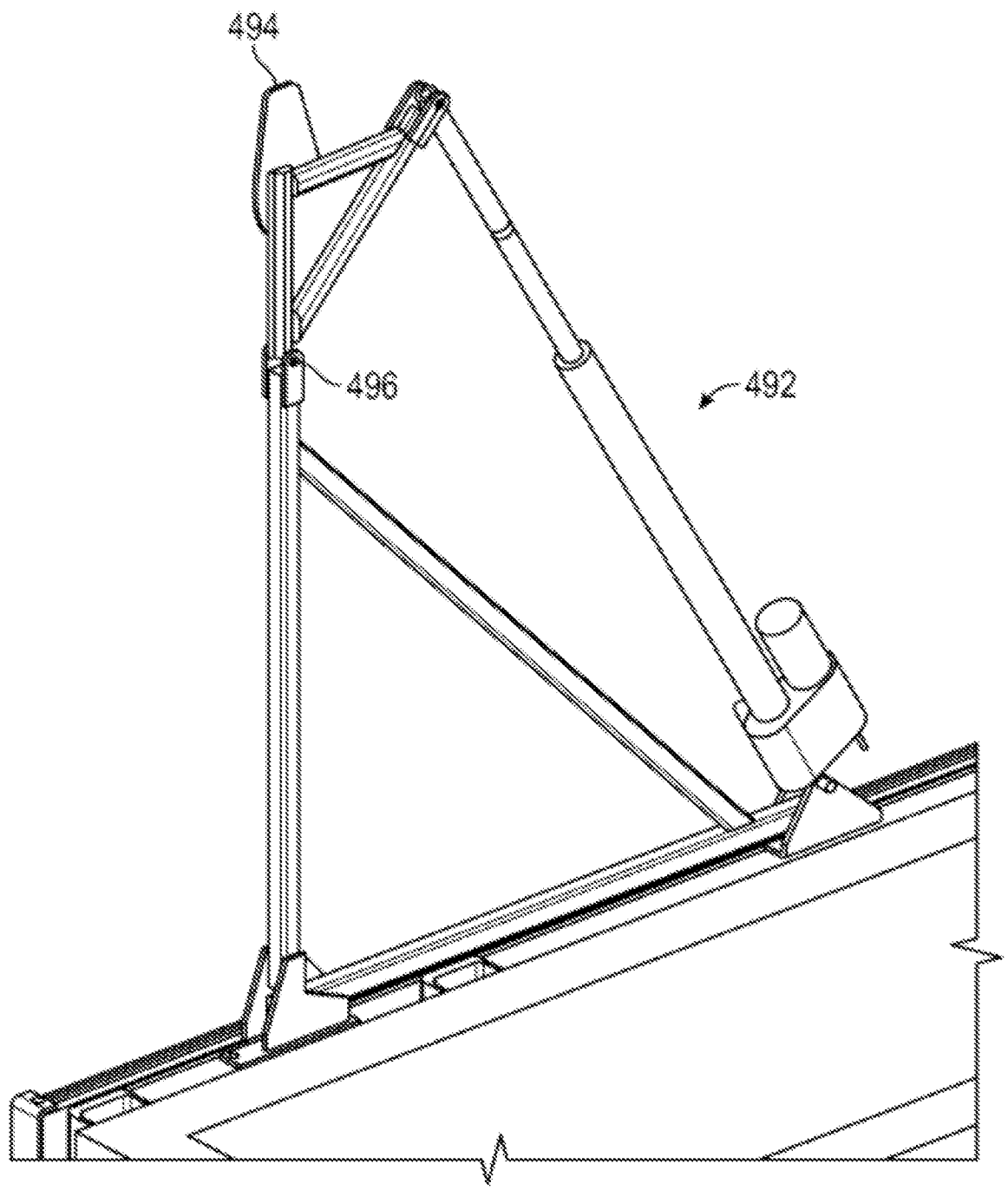
FIG. 14 is a perspective view of a rear tensioning assembly of the rolling tarp deployment system in accordance with the second embodiment of the invention.

Referring specifically to FIG. 14, there is a rear tensioning assembly, indicated generally at 492, of the deployment system 300. The rear tensioning assembly 492 has a tensioning contact portion 494. The rear tensioning assembly 492 rotates the tensioning contact portion 494 about a pivot connection 496 to contact and displace a tensioning receiver on the rear bow to tension the roller tarp system.

Figure 15:
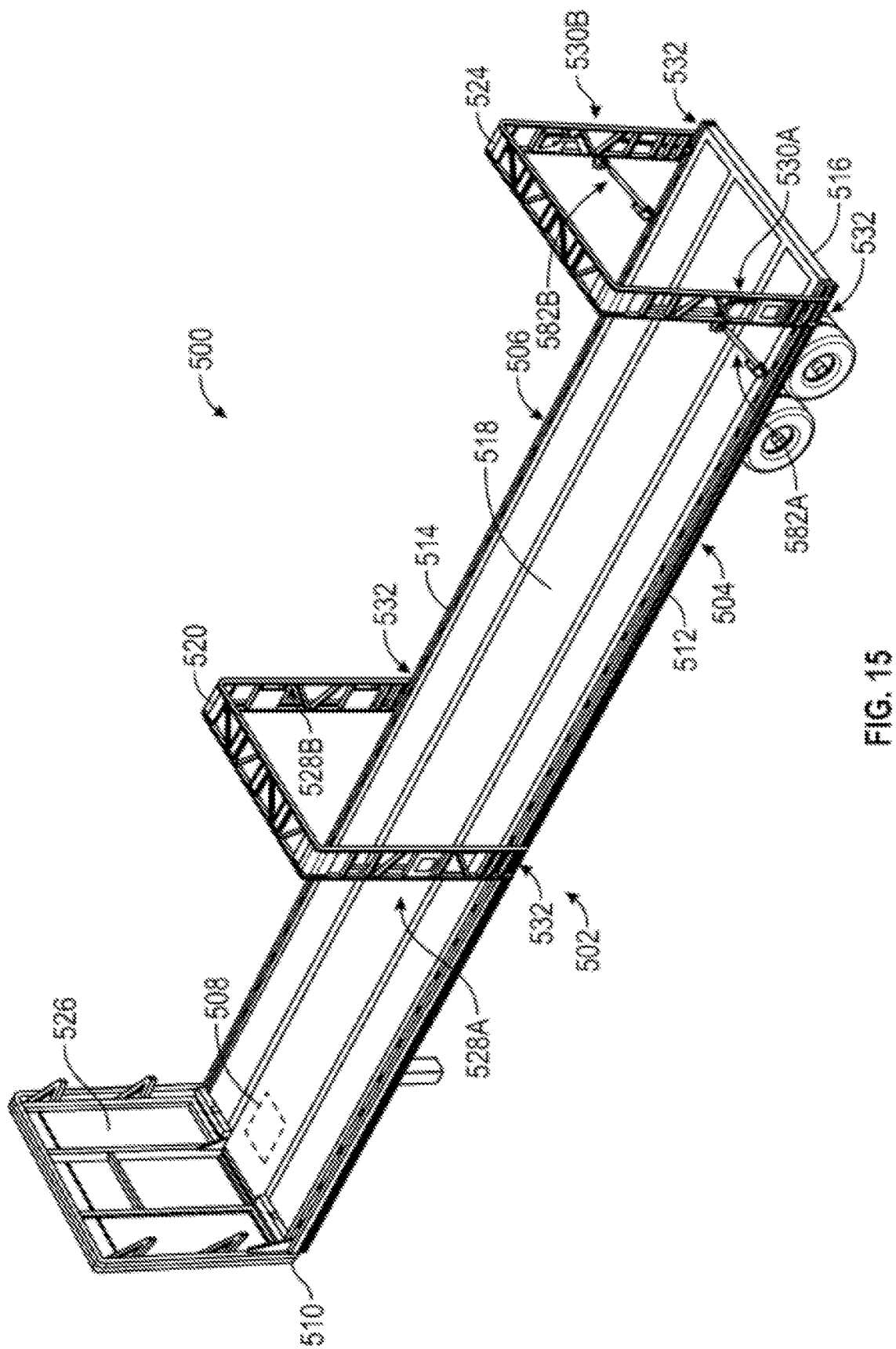
FIG. 15 is a perspective view of a third embodiment of a rolling tarp deployment system in accordance with the invention.

Referring now to FIG. 15, there is illustrated a rolling tarp deployment system, indicated generally at 500, in accordance with a third embodiment of the invention. The deployment system 500 deploys a rolling tarp system, indicated generally at 502. The deployment system 500 is not limited to use with the specific rolling tarp system 502 illustrated. Instead, the deployment system 500 may be used with rolling tarp systems other than the illustrated rolling tarp system 502. Typically, the deployment system 500 deploys the rolling tarp system on a transport system, such as a flatbed trailer, indicated generally at 504.

The flatbed trailer 504 is conventional in the art, with a bed portion, indicated generally at 506, and a towing element 508 (shown by hidden lines) attached to the trailer. The towing element may be configured in any suitable manner, but may be a kingpin associated with a fifth-wheel towing system, a gooseneck towing system, a hitch type trailer towing system, and the like. In some embodiments, the towing element attached to the trailer may be positioned on an underside or a leading edge of the bed portion 506. The towing element 508 generally defines a front portion 510 of the flatbed trailer 504, which may be indicative of a direction in which the flatbed trailer 504 is intended to be towed. Opposing first and second side portions 512 and 514, respectively, and a rear portion 516 of the flatbed trailer 504 are conventionally defined relative to the front portion 510. The bed portion 506 further defines a support or deck surface 518 that forms support for transporting goods thereon. Although the deployment system 500 is illustrated for use with the flatbed trailer 504, any suitable type of transport system capable of accommodating the rolling tarp system 502 may be used. As non-limiting examples, the deployment system 500 may be used with other transport systems such as a railcar, handcart, or other structure. In certain embodiments, the towing element 508 may be adjacent to or connected with a cab portion of a vehicle, such as a stake truck.

In one embodiment, the rolling tarp system 502 includes a plurality of bows including a front bow 520, at least one intermediate bow similar to intermediate bows 122 described above, and a rear bow 524. The intermediate bows are interlinked or otherwise connected with and between the front and rear bows 520 and 524, respectively, such that the front bow 520, intermediate bows, and rear bow 524 may move together. In one embodiment, the interlinking component may be a tarp sheet. Alternatively, cables, folding linkages, or other structures may interconnect the bow, alone or in conjunction with the tarp sheet. The front bow 520, intermediate bows, and rear bow 524 are collectively deployable between a compressed or collapsed state and a deployed or expanded state. In the compressed state, the front bow 520, intermediate bows, and rear bow 524 are positioned tightly together and the flatbed trailer 504 is substantially uncovered. In the deployed state, the front bow 520, intermediate bows, and rear bow 524 are distributed or otherwise arrayed along a length of the flatbed trailer 504 between the front and rear portions 510 and 516, respectively. As illustrated in FIG. 15, the front and rear bows 520 and 524, respectively, are in a partially deployed state on the flatbed trailer 504 that is between the compressed and deployed states and in which the flatbed trailer is partially uncovered.

A tarp section is typically attached over or between the front bow 520, intermediate bows, and rear bow 524. The tarp section may interlink the front bow 520, intermediate bows, and rear bow 524. The rolling tarp system 502 also includes a bulkhead 526 attached to the front bow 520. The bulkhead 526 is preferably also fixed in position in a plane defined by the support surface 518. The bulkhead 526 may be provided differently than as illustrated.

The deployment system 500 includes first and second front tensioning assemblies, indicated generally at 528A and 528B, respectively. Discussion of one of the first and second front tensioning assemblies 528A and 528B, respectively, also applies to the other of the first and second front tensioning assemblies 528A and 528B, respectively, unless otherwise noted. The first and second front tensioning assemblies 528A and 528B, respectively, will be discussed in detail with reference to FIGS. 16 and 17.

The deployment system 500 further includes first and second rear tensioning assemblies, indicated generally at 530A and 530B, respectively. Discussion of one of the first and second rear tensioning assemblies 530A and 530B, respectively, also applies to the other of the first and second rear tensioning assemblies 530A and 530B, respectively, unless otherwise noted. The first and second rear tensioning assemblies 530A and 530B, respectively, will be discussed in detail with reference to FIGS. 18 and 19.

The deployment system 500 also includes electric roller motor assemblies, indicated generally at 532. As a non-limiting example, the electric roller motor assemblies 532 may be used to deploy or compress the rolling tarp system 502. As illustrated, the roller motor assemblies are provided for the front and rear bows 520 and 524, respectively. The roller motor assemblies will be discussed in detail with reference to FIG. 21.

Figure 16:
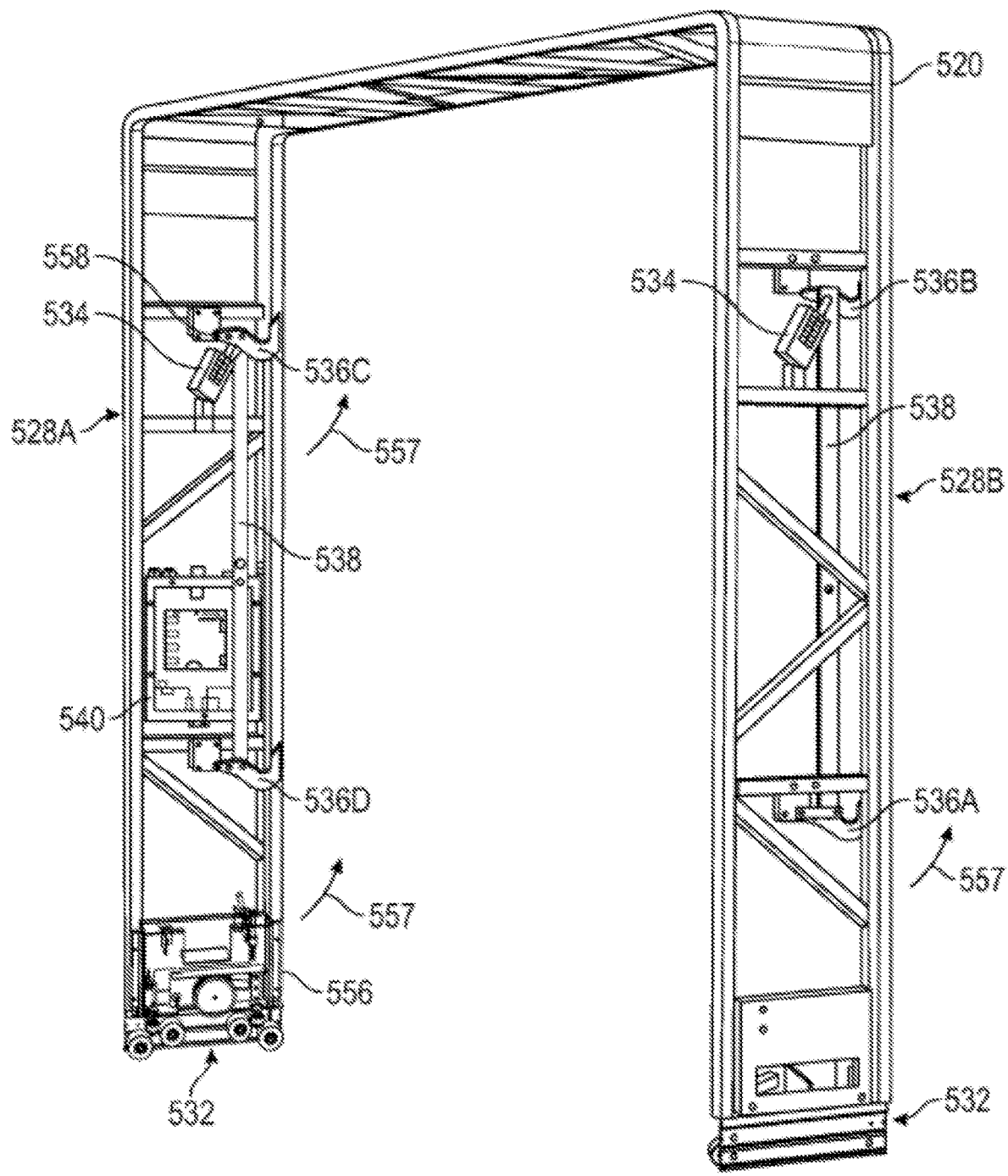
FIGS. 16 and 17 are perspective views of a front tensioning assembly of the rolling tarp deployment system of FIG. 15.
Figure 17:
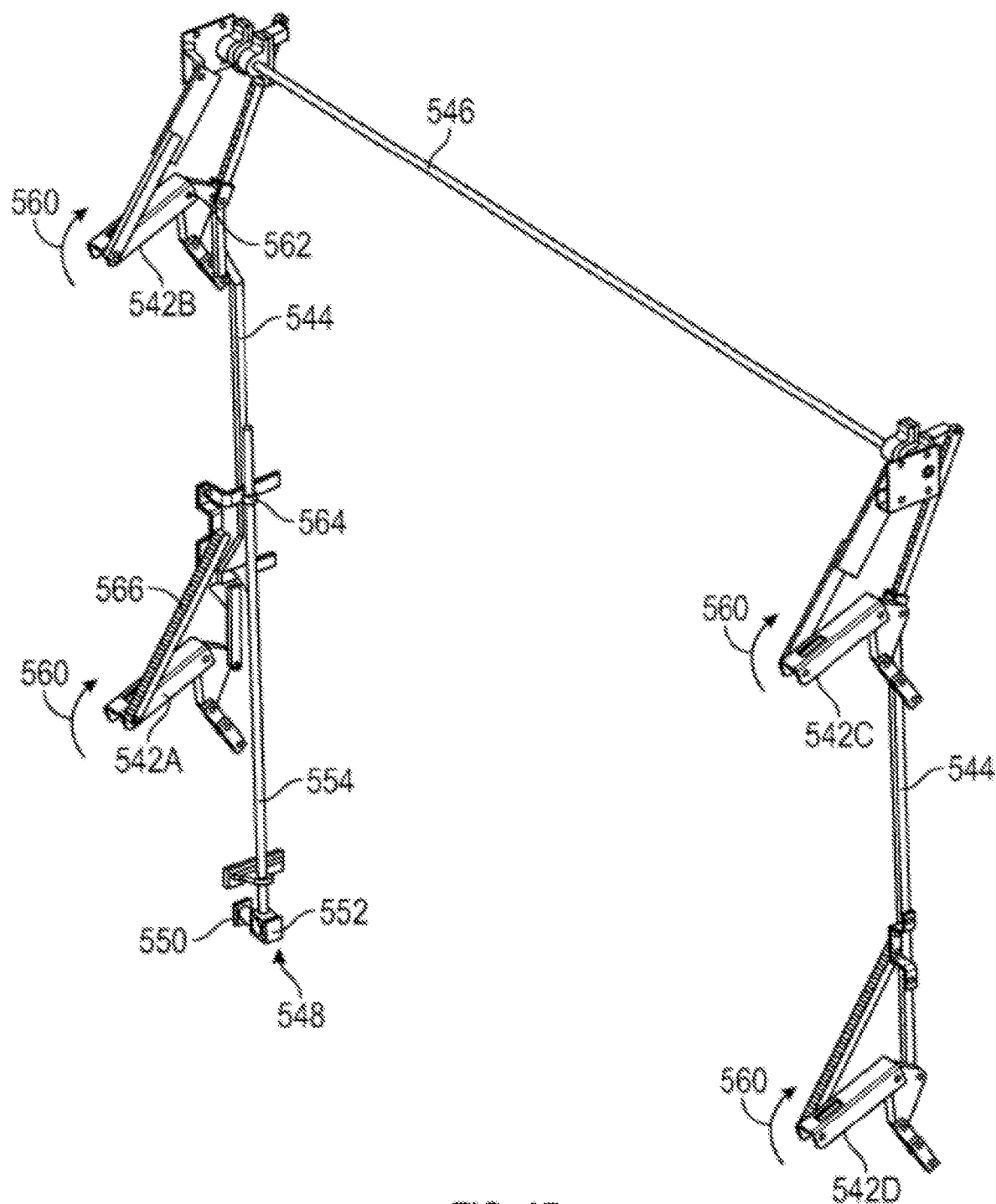

Referring now to FIGS. 16 and 17, there is illustrated the first and second front tensioning assemblies 528A and 528B, respectively, in detail. The first front tensioning assembly 528A includes a pivotally mounted, electric, front tensioning actuator motor 534, pivotally mounted hooks 536A-536D, and an actuator linkage 538 mounted to the front bow 520. Preferably, the actuator motor 534, hooks 536, and actuator linkage 538 are mounted to opposing vertical portions of the front bow 520. The front bow 520 further has at least one of the roller motor assemblies 532 as illustrated for movement of the front bow 520 along the flatbed trailer 504. The front bow 520 is also provided with a front electronic controller 540 for automated operation of the first and second front tensioning assemblies 528A and 528B, respectively, during deployment and compression of the deployment system 500—e.g., operating the actuator motor 534 to actuate the hooks 536—as well as operation of the roller motor assemblies 532 to move the front bow 520. The front electronic controller 540 also preferably coordinates operating of electronic stops, alarms, and/or warning lights for the deployment system 500.

The first front tensioning assembly 528A further includes hook receiver assemblies 542 and a receiver linkage 544. A shaft 546 connects the hook receiver assemblies 542A-542D corresponding to the hooks 536A-536D of the first and second front tensioning assemblies 528A and 528B, respectively. The first front tensioning assembly 528A further includes a manual drive assembly, indicated generally at 548, mounted to the bulkhead 526 that is for manually actuating the hook receiver assemblies 542. As illustrated, the manual drive assembly 548 includes a hand crank receiver 550, a bevel gear hub 552, and a drive shaft 554. As illustrated, the hand crank receiver 550 allows the manual drive assembly 548 to be operated from the ground outside the flatbed trailer 504.

Gaskets, baffles, or other cushioning and/or sealing structures 556 may be provided between the front bow 520 and the bulkhead 526. The gaskets 556 may be provided on both of the front bow 520 and the bulkhead 526 or on only one of the front bow 520 or the bulkhead 526. The sealing structures, particularly where two opposing seals 556 are provided on the front bow 520 and bulkhead 526, can provide a safety function should an operator place an arm or leg between the seals during the closing operation by preventing the hooks from engaging the receivers. Should a smaller appendage, such as a finger or hand, be inserted between the gaskets, the thickness of the gaskets provides sufficient cushioning to accommodate the appendage and prevent injury.

During automated operation of the first and second front tensioning assemblies 528A and 528B, respectively, the roller motor assemblies 532 are first used to position the front bow 520 adjacent the bulkhead 526 such that the hooks 536A-536D may be actuated to engage the hook receiver assemblies 542A-542D. Then, the actuator motor 534 is actuated to rotate each of the hooks 536A-D to engage with the corresponding hook receiver assemblies 542A-D. Second and third hooks 536B and 536C, respectively, are directly actuated by the actuator motors 534 and first and fourth lower hooks 536A and 536D, respectively, are indirectly actuated by the actuator motor 534 via the actuator linkage 538, though any actuation arrangement may be used. The hooks 536A-D are actuated to rotate in a first direction 557 about a first pivot 558. The hook receiver assemblies 542A-D are mounted on the bulkhead 526 such that the hook receiver assemblies 542A-D rotate in a second direction 560 about a second pivot 562 when the hooks 536A-D contact and engage with the hook receiver assemblies 542A-D. Rotation of the hook receiver assemblies 542A-D in the second direction 560 takes up slack between the hooks 536A-D and the hook receiver assemblies 542A-D.

The first and second front tensioning assemblies 528A and 528B, respectively, may be manually actuated to release the first and second front tensioning assemblies 528A and 528B, respectively. The drive shaft 554 is rotated via a hand crank in the hand crank receiver 550. Rotation of the drive shaft 554 linearly translates a rotationally restrained nut 564 along the drive shaft 554. The linear movement of the nut 564 along the drive shaft 554 results in a manual drive linkage 566 rotating a first hook receiver assembly 542A in the second direction 560 about the second pivot 562. The other hook receiver assemblies 542B-D are also rotated in the second direction 560 via the receiver linkage 544 and shaft 546. This raises the hook receiver assemblies 542A-D such that the hook receiver assemblies 542A-D disengage from the hooks 536A-D. Furthermore, rotation of either of second or third hook receiver assemblies 542B or 542C, respectively, in the second direction 560 also rotates the shaft 546 in the second direction 560, which results in the other of the second or third hook receiver assemblies 542B or 542C, respectively, also rotating in the second direction 560. A fourth receiver assembly 542D is connected to the third hook receiver assembly 542C by a receiver linkage 544.

As illustrated, four hooks 536 and four corresponding hook receiver assemblies 542 are provided for the deployment system 500. Alternatively, more or fewer than four hooks 536 and/or hook receiver assemblies 542 may be provided for the deployment system 500.

Figure 18:
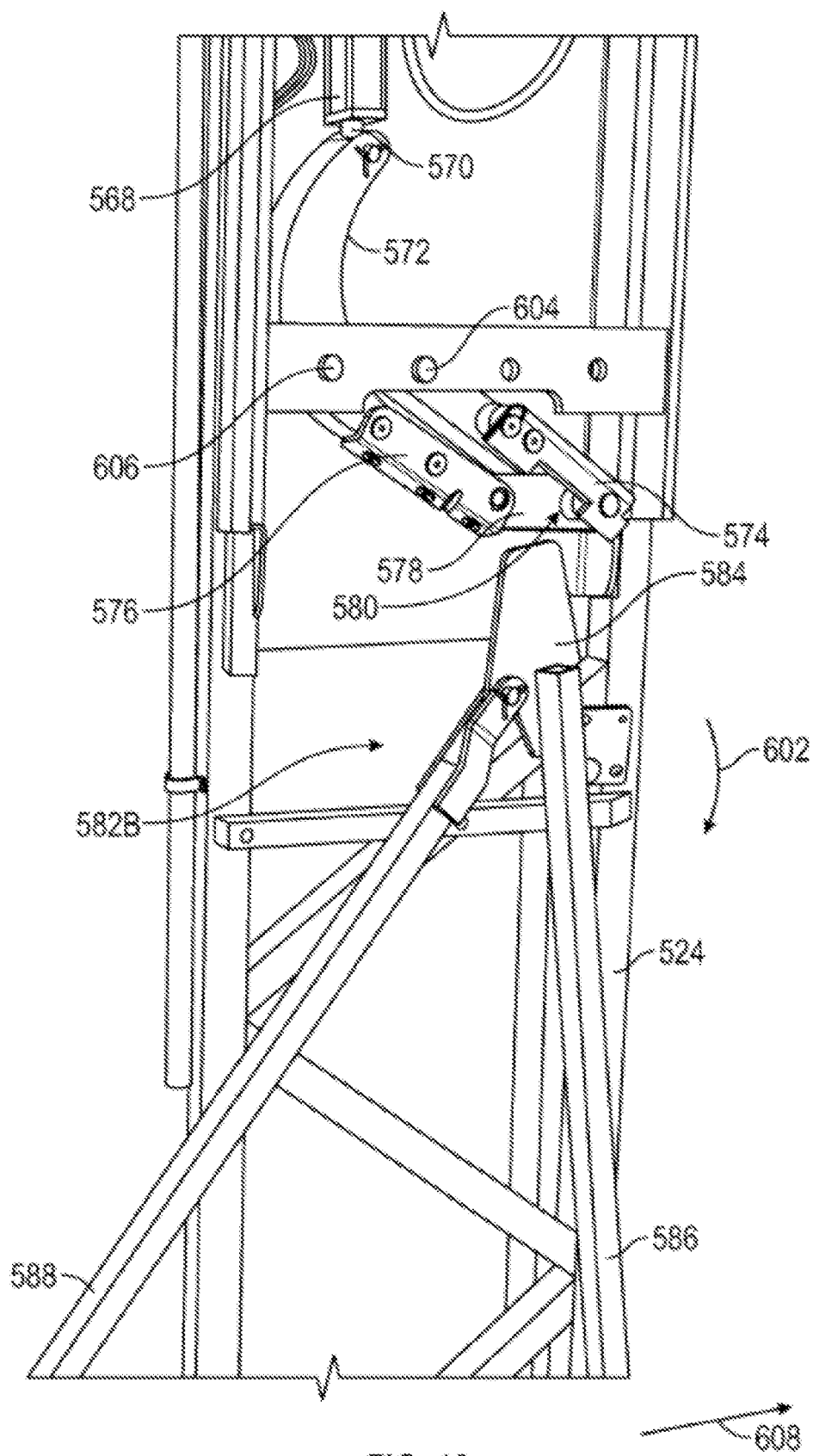
FIG. 18 is an elevation view of a rear tensioning assembly of the rolling tarp deployment system of FIG. 15 in a first position.
Figure 19:
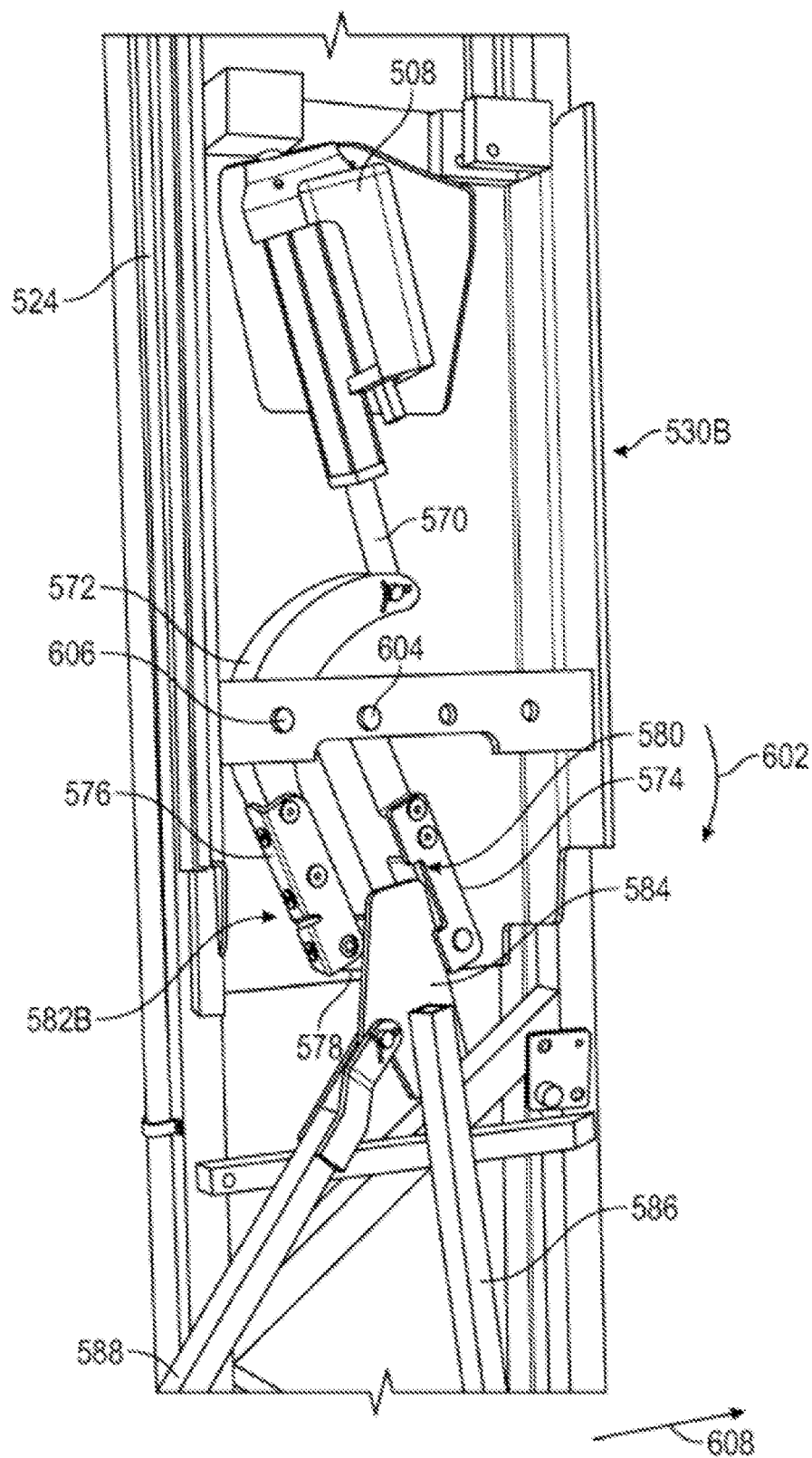
FIG. 19 is an elevation view of the rear tensioning assembly of FIG. 18 in a second position.

Referring now to FIGS. 18 and 19, there is illustrated the second rear tensioning assembly 530B. The second rear tensioning assembly 530B includes a pivotally mounted, electric, rear tensioning actuator motor 568 that linearly extends or retracts a rod 570 to which a tension link 572 is pivotally connected. While the tension link 572 is illustrated with an arcuate shape, such is not required. A tension link support 574 is pivotally connected to the tension link 572 and a tension link reinforcement 576 is rigidly connected to the tension link 572. The tension link support 574 is pivotally mounted to the rear bow 524 and hinged to move in consort with the tension link reinforcement 576, such as a four bar linkage arrangement. As a non-limiting example, the tension link 572 and the tension link reinforcement 576 may be formed as a single, unitary, or otherwise monolithic member. The tension link support 574 is pivotally connected to the tension link reinforcement 576 by a load cell link 578. The actuator motor 568, rod 570, tension link 572, tension link support, tension link reinforcement 576, and load cell link 578 are supported by the rear bow 524.

A first distance between the tension link supports 574 for the first and second rear tensioning assemblies 530A and 530B, respectively, is less than a second distance between the tension link reinforcements 576 for the first and second rear tensioning assemblies 530A and 530B, respectively, wherein the first and second distances are parallel to each other and both transverse to the intended direction of towing for the flatbed trailer 504. As a result, the tension link support 574 has a greater dimension—i.e., thickness—in a direction transverse to the intended direction of towing than the tension link reinforcement 576 such that the tension link support 574 and the tension link reinforcement 576 form a pocket, indicated generally at 580. The pocket 580 will be discussed further with reference to FIG. 19.

Figure 20:
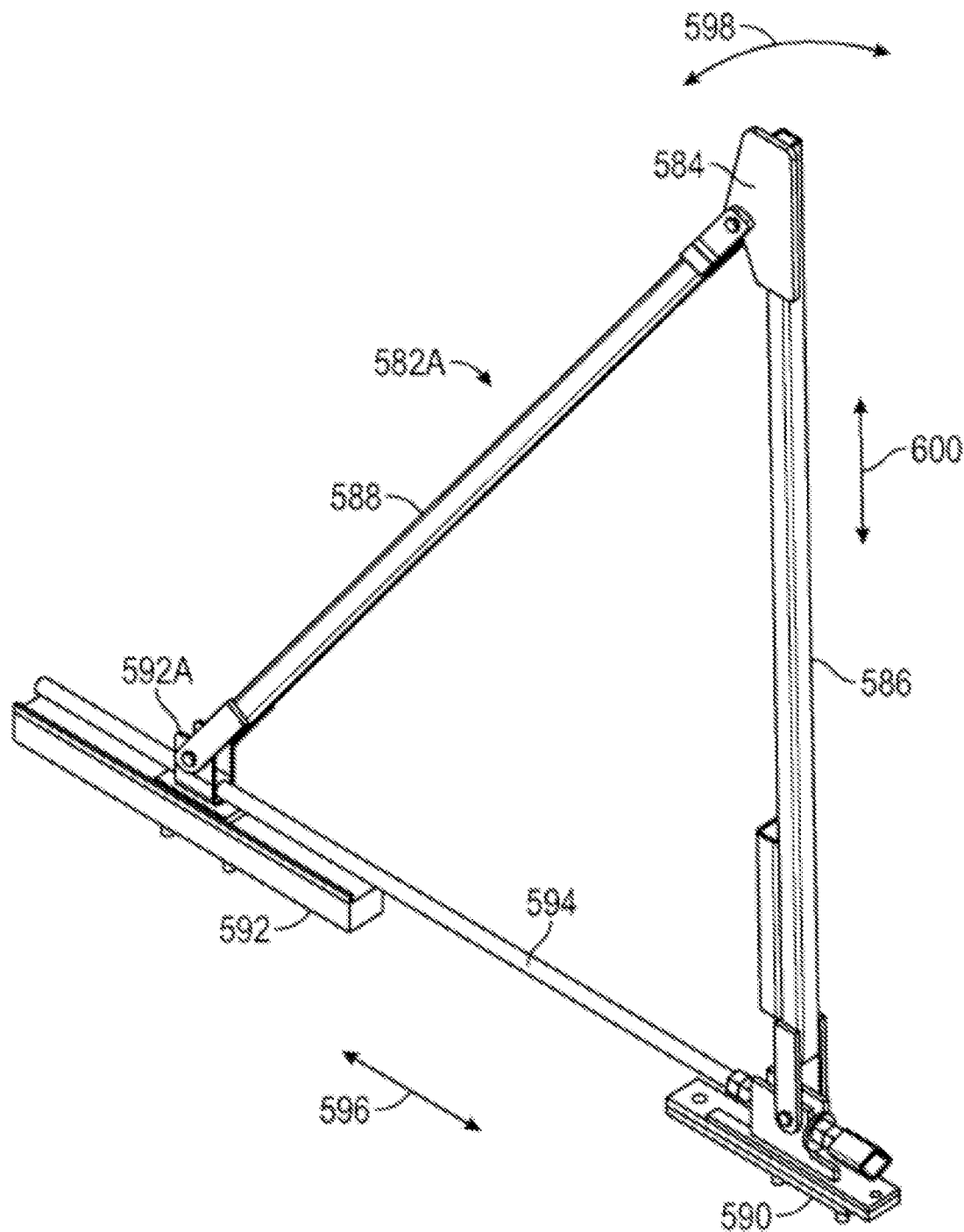
FIG. 20 is an elevation view of a tensioning receiver assembly of the rear tensioning assembly.

Referring now to FIG. 20, the first rear tensioning assembly 530A further includes a first rear tensioning receiver assembly, indicated generally at 582A. The first tensioning receiver assembly 582A is mounted to the bed portion 506. Discussion of one of the first or second tensioning receiver assemblies 582A or 582B, respectively, also applies to the other of the first or second tensioning receiver assemblies 582A or 582B, respectively, unless otherwise noted.

The first tensioning receiver assembly 582A includes a contact plate 584 rigidly fixed to a first structural member 586. A second structural member 588 is pivotally connected to the first structural member 586. The first structural member 586 is pivotally fixed to a first base member 590 and the second structural member 588 is pivotally connected to a second base member 592. The first base member 590 is fixed to the bed portion 506. The second base member 592 is fixed to the bed portion 506 and an adjustable hinge 592A has a sliding connection to the second base member 592. A position of the adjustable hinge 592A relative to the second base member 592 is adjusted by a threaded rod 594. As illustrated, the threaded rod 594 is manually adjustable by a hand crank (not shown). Alternatively, the threaded rod 594 may be adjustable by a motor. The adjustable hinge 592A may be adjusted in a third direction 596 relative to the second base member 592, and thus the bed portion 506, such that the contact plate 584 rotates in a fourth direction 598 and a vertical elevation 600 of the contact plate 584 is adjusted. Preferably, the vertical elevation 600 of the contact plate 584 is coordinated with a similar vertical elevation of the pocket 580.

In one embodiment, a third distance between the contact plates 584 of the first and second tensioning receiver assemblies 582A and 582B, respectively, is greater than a fourth distance between the first base members 590 of the first and second tensioning receiver assemblies 582A and 582B, respectively. The third and fourth distances are parallel and transverse to the intended direction of towing for the flatbed trailer 504. As a result, the first and second tensioning receiver assemblies 582A and 582B, respectively, are mounted to the bed portion 506 such that the contact plates 584 are positioned over the first and second sides 512 and 514 of the bed portion 506. In another embodiment, the distance between contact plates 584 of the spaced apart first and second tensioning receiver assemblies 582A and 582B is within the envelope of the tarp and rear bow assembly and positioned generally in a plane defined by the pivot points of the linkages. The contact plates 584 engage pockets 580 of the associated tensioning receiver assemblies 582A and 582B.

During automated operation of the second rear tensioning assembly 530B, the roller motor assemblies 532 are first used to position the rear bow 524 at the rear portion 516 of the bed portion 506. With the rear bow 524 in position relative to the first and second tensioning receiver assemblies 582A and 582B, respectively, the rolling tarp system 502 is tensioned. The actuator motor 568 is operated to rotate the tension link support 574 and the tension link reinforcement 576 in a fifth direction 602. The tension link support 574 rotates about a third pivot 604 and the tension link reinforcement 576 rotates about a fourth pivot 606.

The actuator motor 568 rotates the tension link support 574 and the tension link reinforcement 576 from a first position (shown in FIG. 18) and towards a second position (shown in FIG. 19 with the pivotally mounted actuator motor 568 also rotated) such that the contact plate 584 enters the pocket 580 and contacts the tension link support 574. Preferably, the contact plate 584 contacts the tension link support 574 as shown in FIG. 19. As a result, and with the front bow 520 restrained by the first and second front tensioning assemblies 528A and 528B, respectively, the rear bow 524 is moved in a sixth direction 608 that is away from the front bow 520. Typically, the sixth direction 608 is parallel to the intended direction of towing for the flatbed trailer 504.

Movement of the rear bow 524 in the sixth direction 608 introduces a tensioning force in the rolling tarp system 502. Movement of the tension link support 574 and the tension link reinforcement 576 towards the front portion 510 increases the tensioning force. Movement of the tension link support 574 and the tension link reinforcement 576 away from the front portion 510 decreases the tensioning force.

Preferably, the load cell link 578 is used to measure the tensioning force so that a desired tensioning force may be realized. Preferably, the load cell link 578 is used so that the first and second rear tensioning assemblies 530A and 530B, respectively, may achieve a preset tensioning load. Furthermore, the load cell link 578 may be used to maintain and/or adjust the tensioning force to the preset tensioning load while the deployment system 500 is deployed—e.g., the tensioning force may be maintained or adjusted while the flatbed trailer 504 is being transported.

Figure 21:
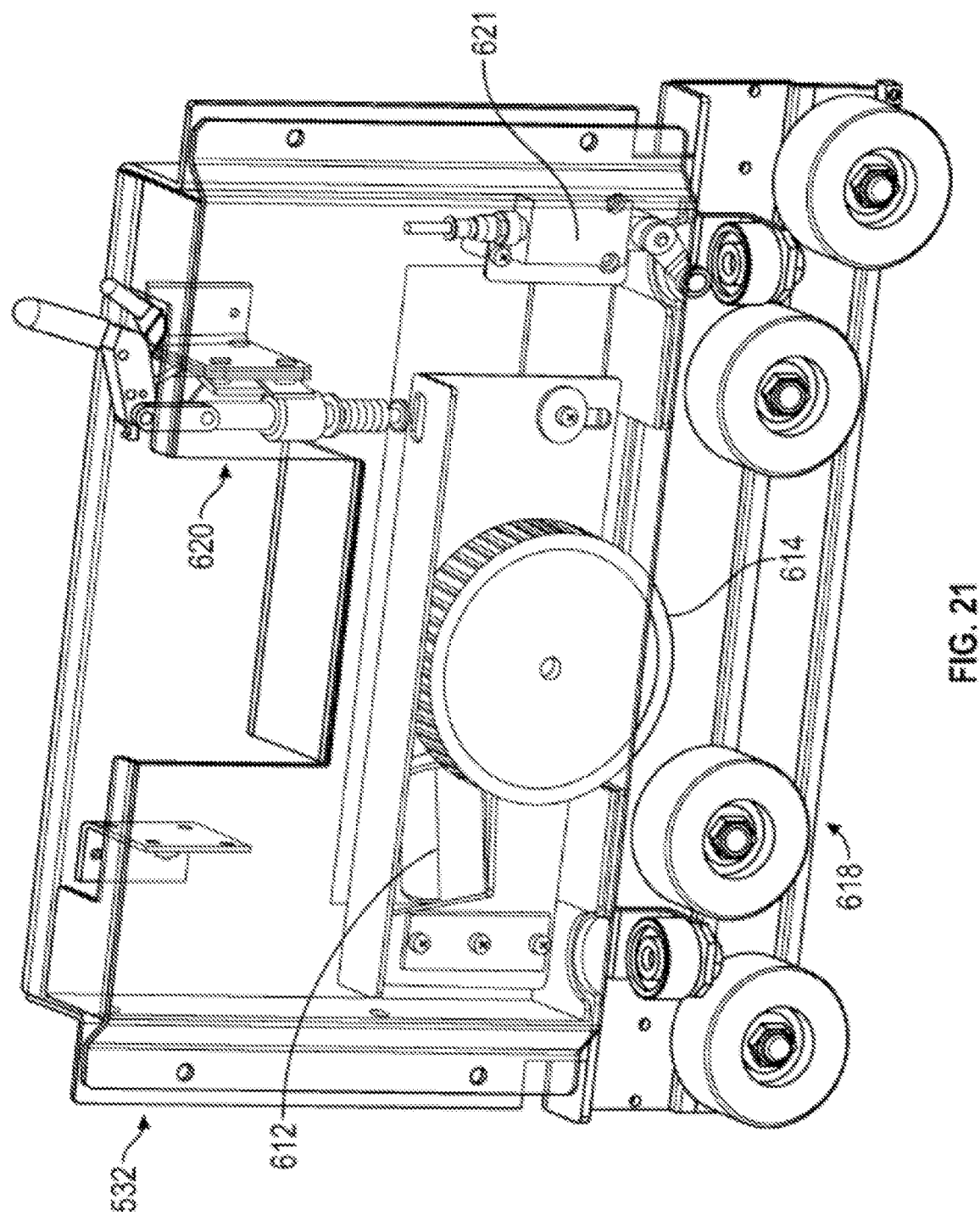
FIG. 21 is an elevation view of a motorized roller assembly of the rolling tarp deployment system of FIG. 15.

Referring now to FIG. 21, there is illustrated one of the roller motor assemblies 532 for the deployment system 500. As non-limiting examples, the roller motor assembly 532 illustrated in FIG. 21 may be mounted to and propel the front or rear bows 520 or 524, respectively, or both bows.

The roller motor assembly 532 includes an electric drive motor 612 driving a drive wheel 614. The drive wheel 614 propels the roller motor assembly 532 on a track 616 (shown in FIG. 25). Preferably, the drive wheel 614 is an anti-slip wheel, though such is not required. Alternatively, the drive wheel 614 may be a toothed wheel that engages a corresponding and mating toothed track (not shown) attached to the bed portion 506. Lower rollers, indicated generally at 618, are within track passages below an upper surface of the track 616 to provide stability for the roller motor assembly 532. A manual release 620 selectively operates a clamping mechanism to engage or disengage the drive wheel 614 from the track 616. The manual release 620 engages the drive wheel 614 by pressing the drive wheel 614 against the track 616 and provides consistent traction between the drive wheel 614 and the track 616. The drive wheel 614 may be disengaged from the track 616, by using the manual release 620, to allow the front bow 520, intermediate bows, or rear bow 524 to be moved manually along the bed portion 506. The roller motor assembly 532 also includes a limit switch 621 for determining and controlling a position of the roller motor assembly 532 on the flatbed trailer 504.

Figure 22:
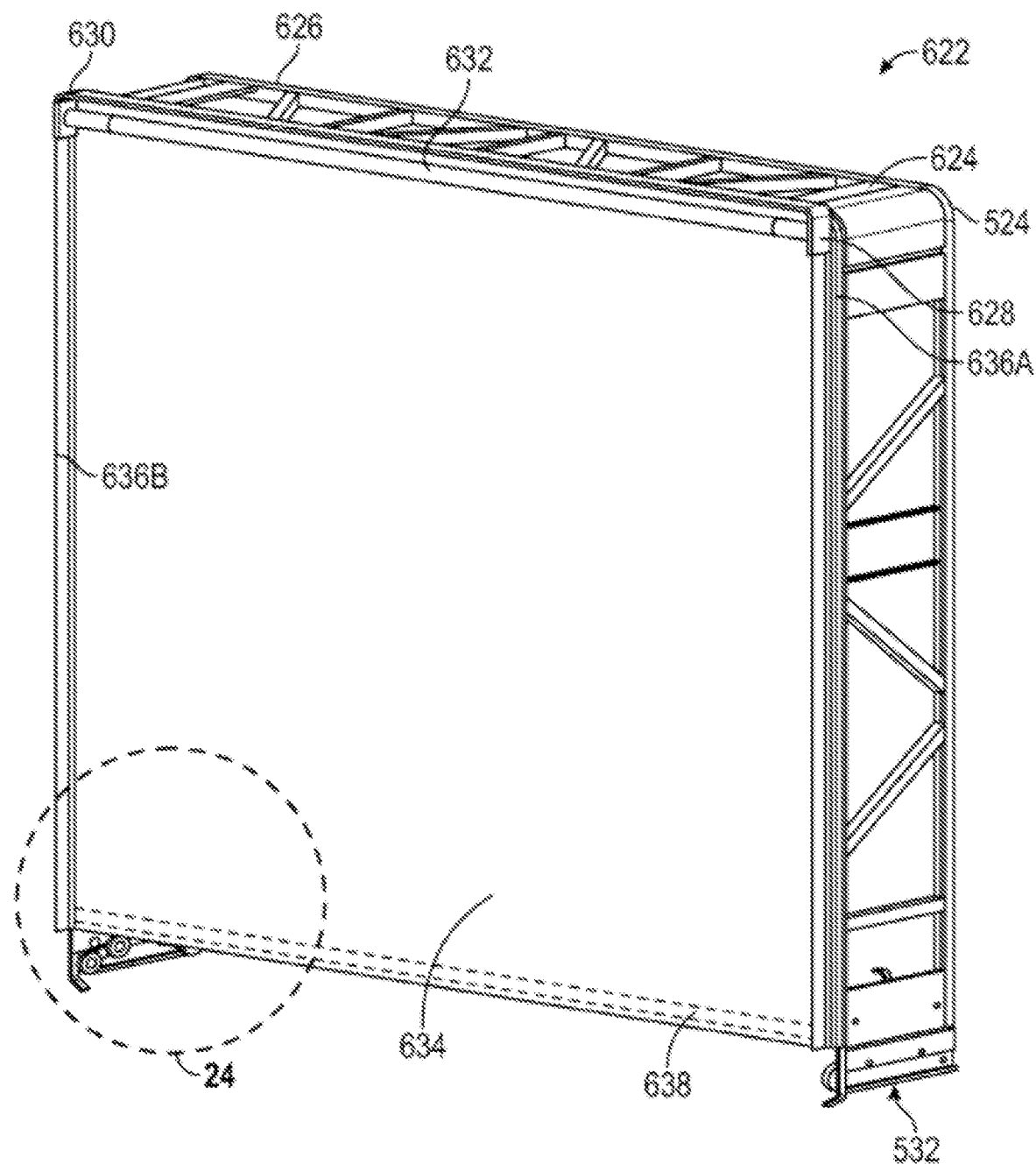
FIG. 22 is a first elevation view of a rear cover assembly of the rolling tarp deployment system of FIG. 15 in a first position.
Figure 23:
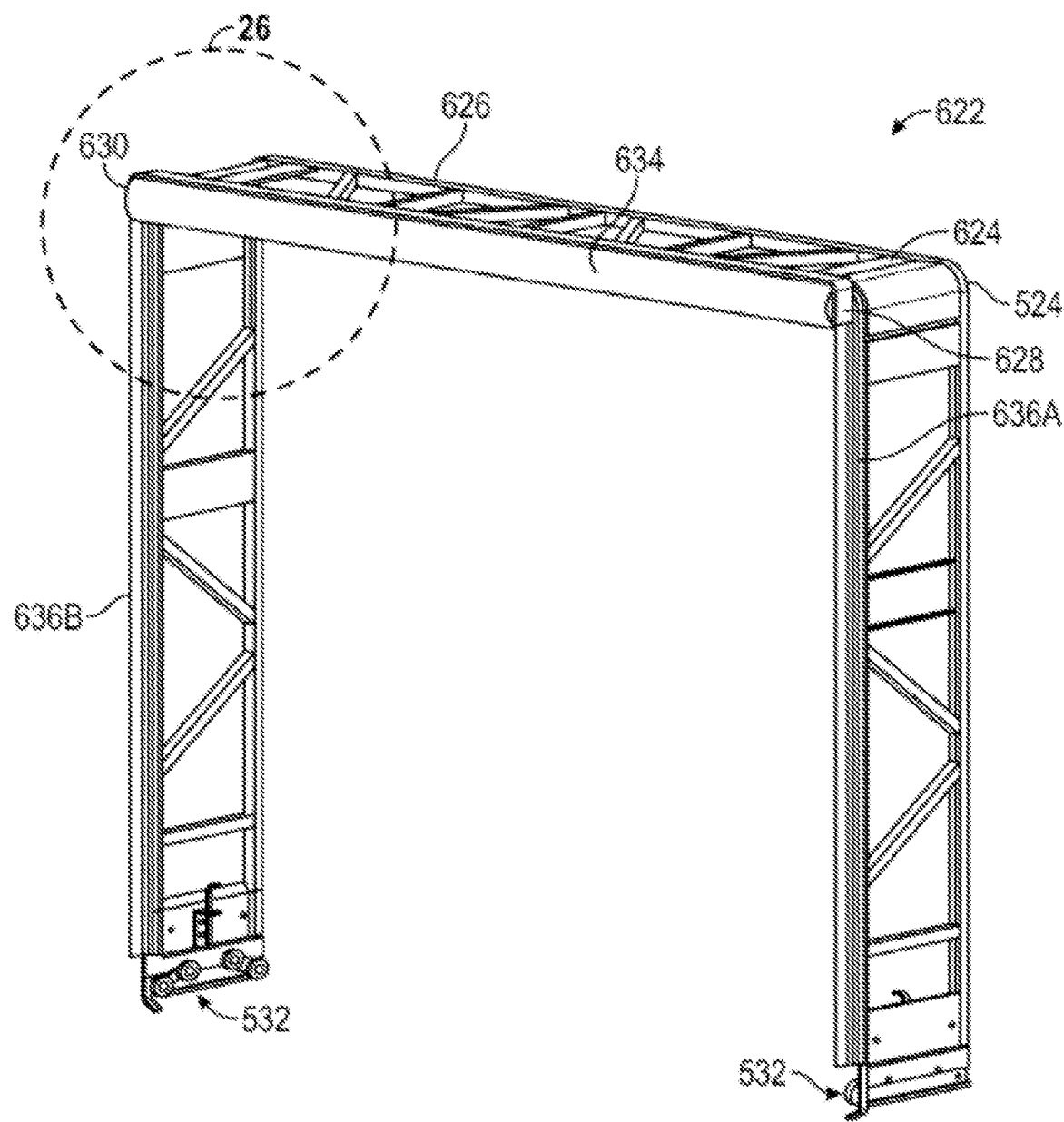
FIG. 23 is a second elevation view of the rear cover assembly of FIG. 22 in a second position.

The deployment system 500 may also include a rear cover assembly, indicated generally at 622. The rear cover assembly 622 is illustrated in a deployed position in FIG. 22 and in a retracted position in FIG. 23. Preferably, the rear cover assembly 622 is attached to the rear bow 524. In FIGS. 22 and 23, the first and second rear tensioning assemblies 530A and 530B, respectively, are omitted for clarity.

The rear cover assembly 622 is mounted to an extension cover 624 that is in turn mounted to the rear bow 524. Preferably, the extension cover 624 is provided on the rear bow 524 as illustrated. Alternatively, the extension cover 624 may be provided other than as illustrated. As a non-limiting example, the extension cover 624 may be provided only for a top side 626 of the rear bow 524.

The rear cover assembly 622 includes first and second electric motors 628 and 630, respectively, which are connected by a rod 632, and a cover 634. Alternatively, more or fewer than the first and second electric motors 628 and 630, respectively, may be provided. As illustrated, the cover 634 is a soft, non-rigid cover. When the cover 634 is the soft, non-rigid cover illustrated, the first and second electric motors 628 and 630, respectively, are operated to roll the cover 634 on to the rod 632 from the deployed position in FIG. 22 to the retracted position in FIG. 23. Alternatively, the cover 634 may be a rigid or partially rigid cover. As a non-limiting example, the cover 634 may be a plurality of rigid horizontal slats, connected by flexible fabric pleats, and raised and compressed in an accordion manner.

Preferably, first and second vertical members 636A and 636B, respectively, of the extension cover 624 are C-shaped channels that guide movement of the cover 634 up and down between the deployed and retracted positions. Furthermore, the cover 634 is provided with a bar 638 (shown by a dashed line in FIG. 22) at an end opposite the rod 632. The bar 638 provides weighting of the cover 634. Preferably, rollers 640 are provided on opposite ends of the bar 638 to roll in the C-shaped channels of the first and second vertical members 636A and 636B, respectively. A stabilizer member 642 is provided for the rollers 640.

Figure 26:
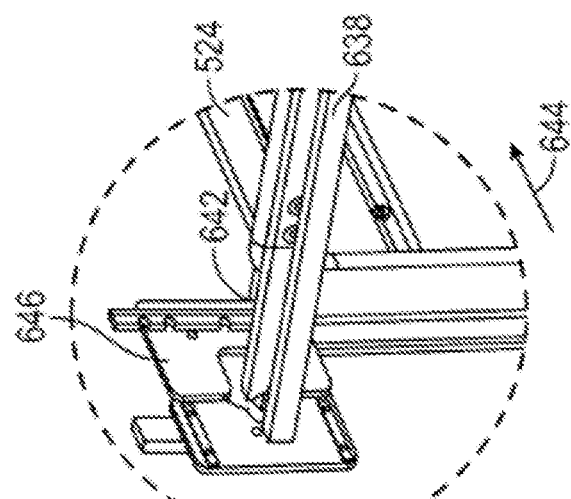
FIG. 26 is an enlarged portion of FIG. 23.
Figure 25:
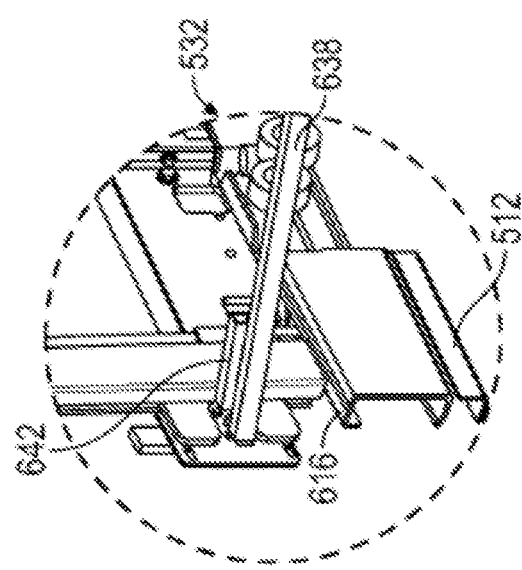
FIG. 25 is an enlarged portion of the rear cover assembly of FIGS. 22 and 23 in a free movement position.
Figure 24:
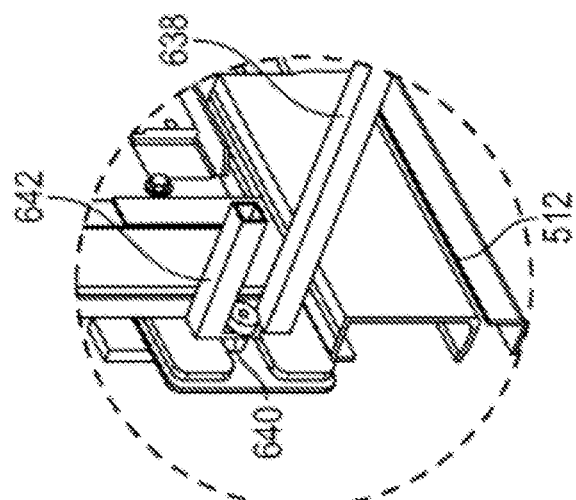
FIG. 24 is an enlarged portion of FIG. 22.

FIG. 24 illustrates the bar 638 in a locked down position. Preferably, the bar 638 is in the locked down position when the rear cover assembly 622 is in the deployed position. FIG. 25 illustrates the bar 638 in a free movement position. The bar 638 is in the free movement position when the rear cover assembly 622 is moved between the deployed and retracted positions. FIG. 26 illustrates the bar 638 ready to be placed in a locked up position. To place the bar 638 into the locked up position, the bar 638 is moved in a forward direction 644 and into a recess 646. The cover 634 is omitted from FIGS. 24-26 for clarity.

The deployment system 500 may be actuated by an operator, such as a driver or tractor/trailer operator with the electronic or manual systems described above. Alternatively, the deployment system 500 may be coupled to a controller of an autonomous vehicle, such as an autonomous tractor-trailer system, to be deployed by the vehicle rather than a human operator. In such a system, the vehicle controller may respond to an input, such as an indication of arrival at the desired destination, and contact the recipient and autonomously activating the deployment system to permit loading or unloading of goods.

Referring now to FIGS. 27-30, there is illustrated a fourth embodiment of a rolling tarp deployment system, indicated generally at 700, in accordance with the invention. The roller tarp deployment system 700 is for a roller tarp system and is a variation of the deployment system 500 previously discussed with reference to FIGS. 15-26. As such, like reference numerals, incremented by 200, designate corresponding parts in the drawings and detailed description thereof will be omitted.

Figure 27:
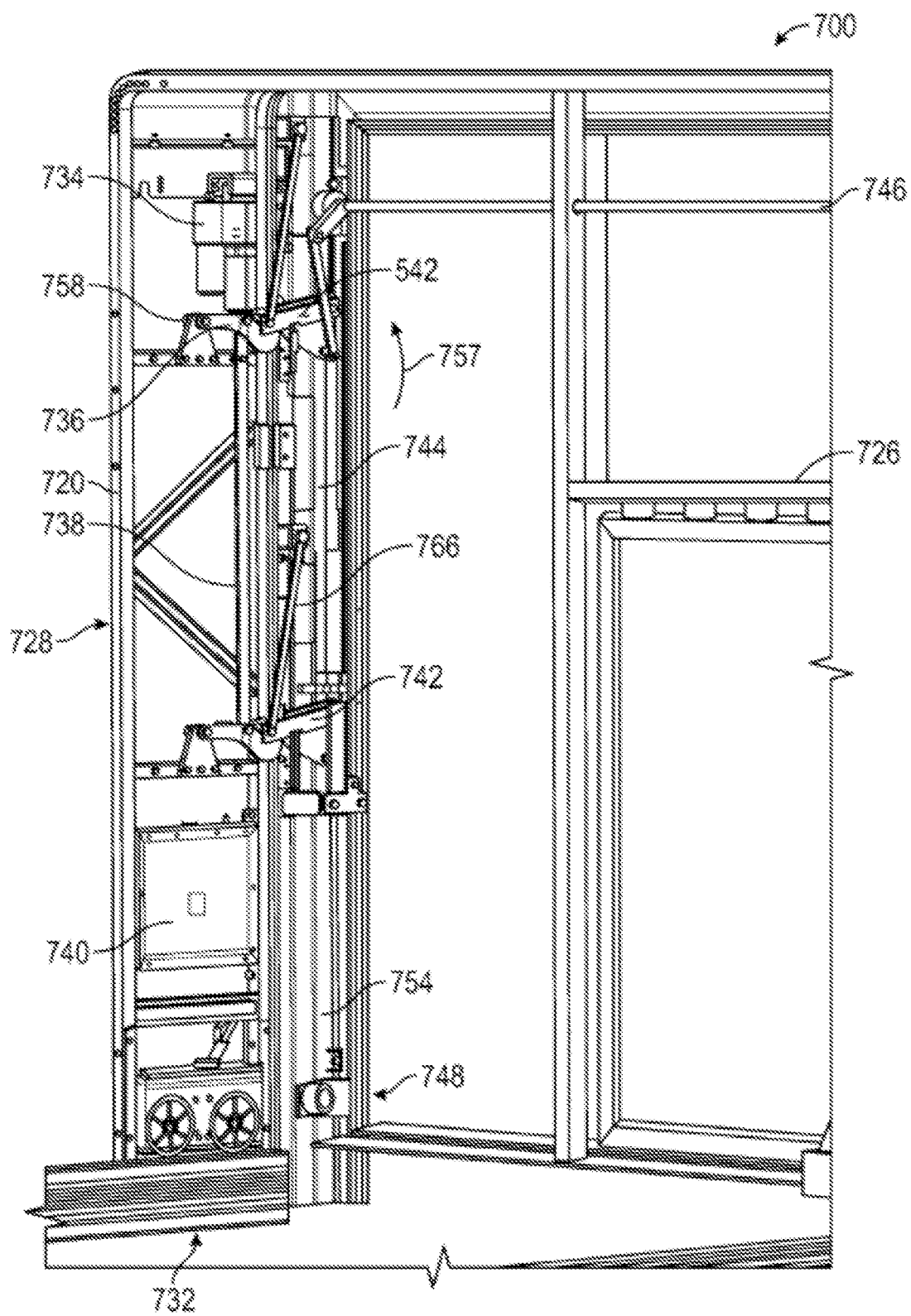
FIG. 27 is a perspective view of a front tensioning assembly of a rolling tarp deployment system in accordance with a fourth embodiment of the invention.

Referring now to FIG. 27, there is illustrated a front tensioning assembly 728. The front tensioning assembly 728 includes an actuator motor 734 positioned above hooks 736. The actuator motor 734 rotates the hooks 736 in a first direction 757.

Figure 28:
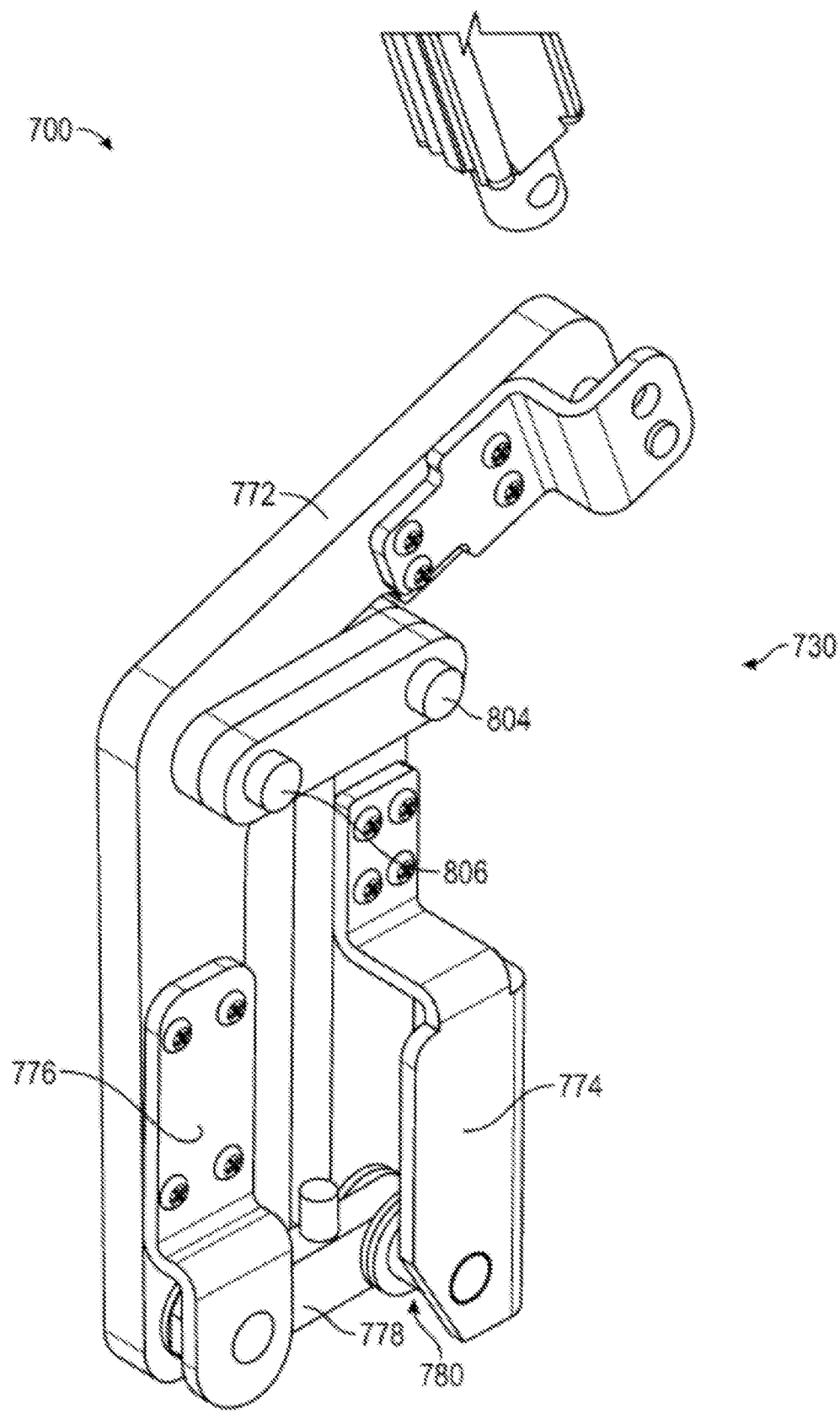
FIGS. 28-30 are perspective views of a rear tensioning assembly of the rolling tarp deployment system in accordance with the fourth embodiment of the invention.
Figure 29:
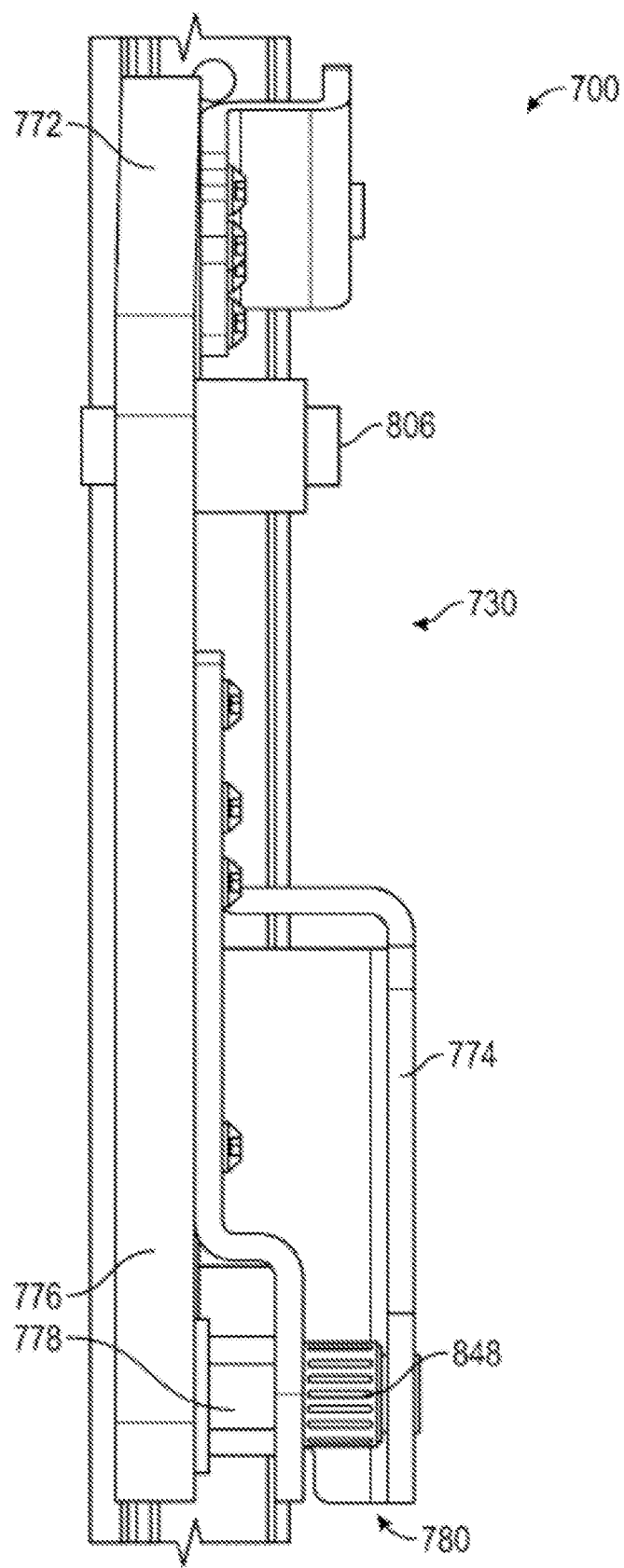
Figure 30:
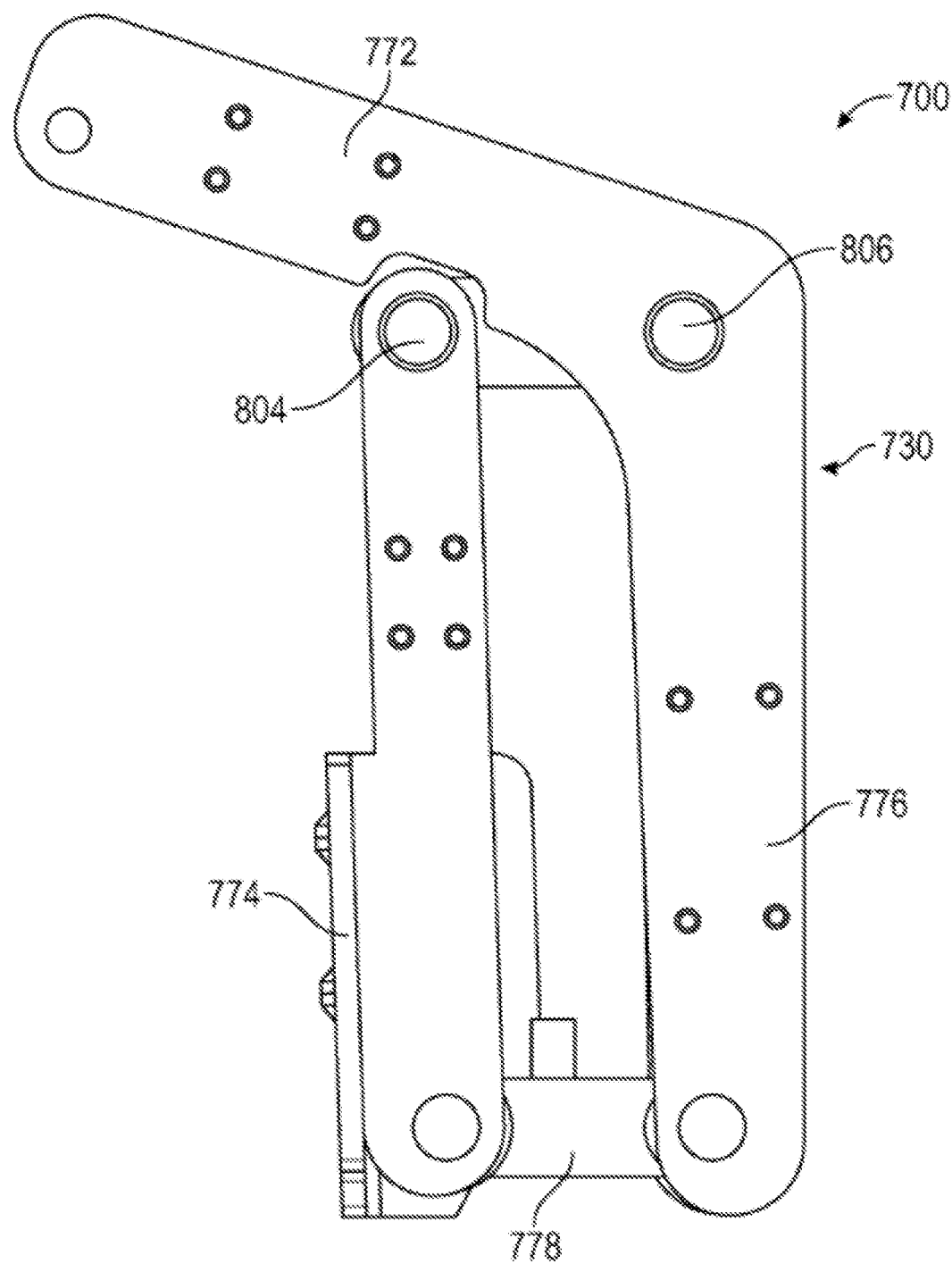

Referring now to FIGS. 28-30, there is illustrated a portion of a rear tensioning assembly 730 that includes a tension link 772, a tension link support 774, a tension link reinforcement 776, and a load cell link 778. The tension link support 774 defines a pocket 780. Within the pocket 780 is a bearing member 848. The pocket 780 receives a corresponding contact plate. The contact plate contacts the bearing member 848.

Referring now to FIGS. 31A-32B, there is illustrated a rear portion of a rolling tarp assembly, shown generally at 900. The rolling tarp assembly may be either a manually or automatically deployed system. A rear sliding bow assembly 902 is illustrated having fore and aft bow frames 904a and 904b, respectively, connected together by support arms 906 and lower roller assemblies 908. The lower roller assemblies 908 may be motorized or manually powered roller assemblies that engage guide track assemblies, such as guide track assembly 180 mounted on the flatbed trailer 104. The rear sliding bow assembly 900 may include spaced-apart anchor plates 910 that are secured to the fore and aft bow frames and carry a hook plate assembly, shown generally at 912. A tensioning mechanism, shown generally at 916, is mounted to the trailer bed portion of the flatbed trailer 104.

Figures 31A, 31B:
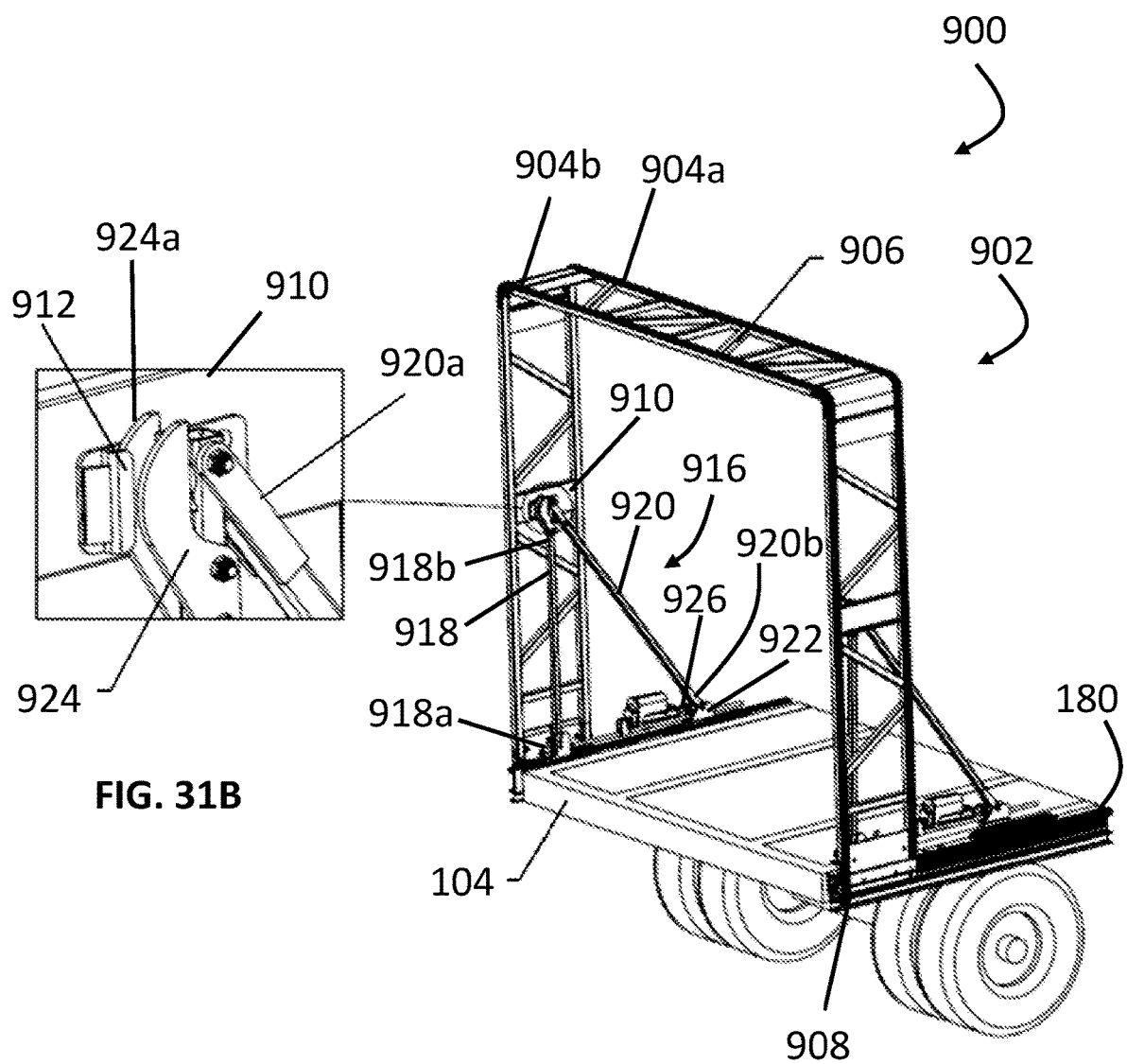
FIG. 31A is a perspective view of a rear portion of a rolling tarp assembly and tensioning mechanism in accordance with the invention.
FIG. 31B is an enlarged, perspective view of a hook and an engagement blade portion of the tensioning mechanism of FIG. 31A shown in an engaged position with the tarp assembly.
Figures 32A, 32B:
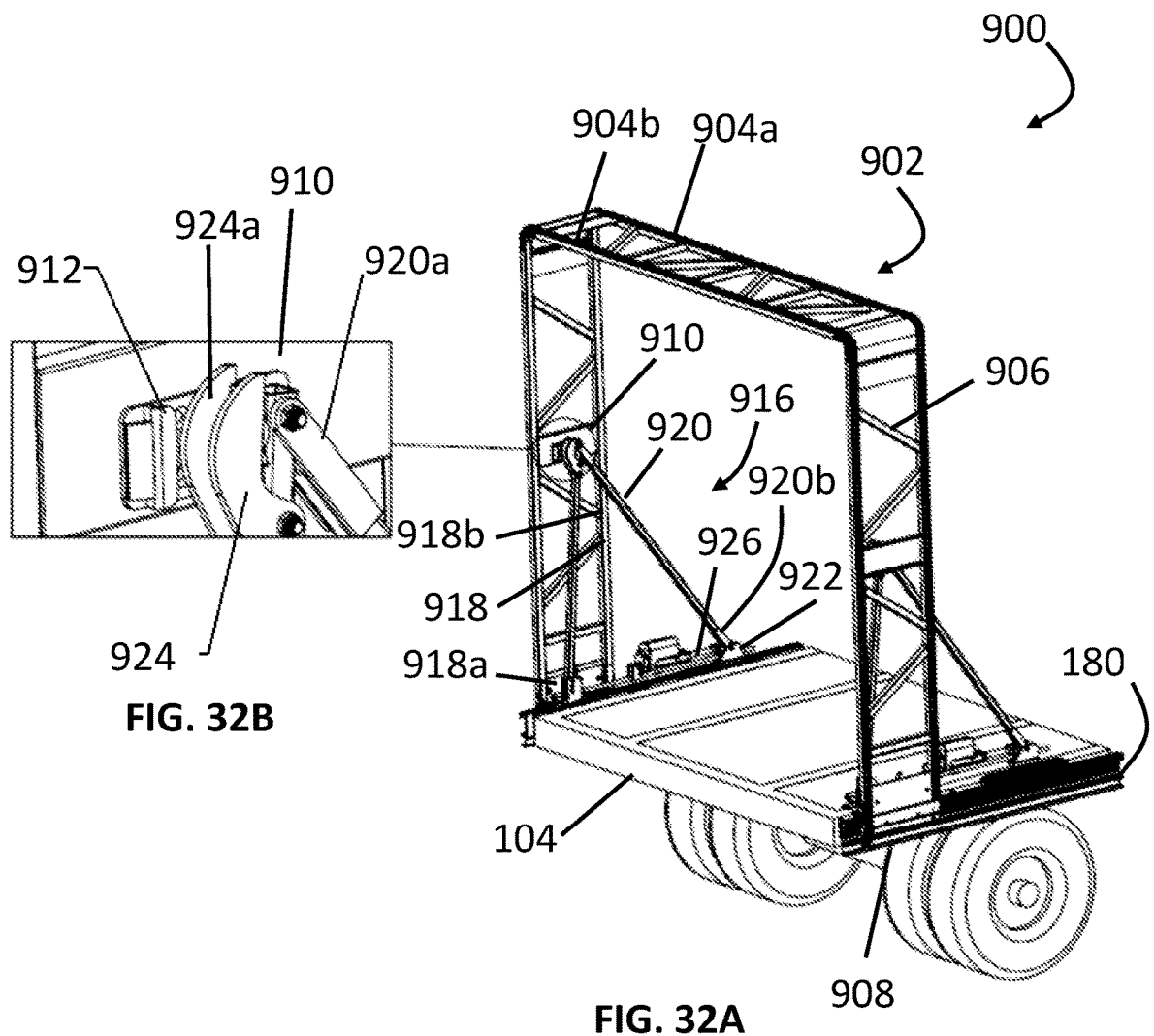
FIG. 32A is a perspective view of the rolling tarp assembly and tensioning mechanism of FIG. 31A showing the tensioning mechanism in a disengaged position.
FIG. 32B is an enlarged, perspective view of a hook and an engagement portion of the tensioning mechanism of FIG. 32A shown in the disengaged position with the tarp assembly.
Figure 34:
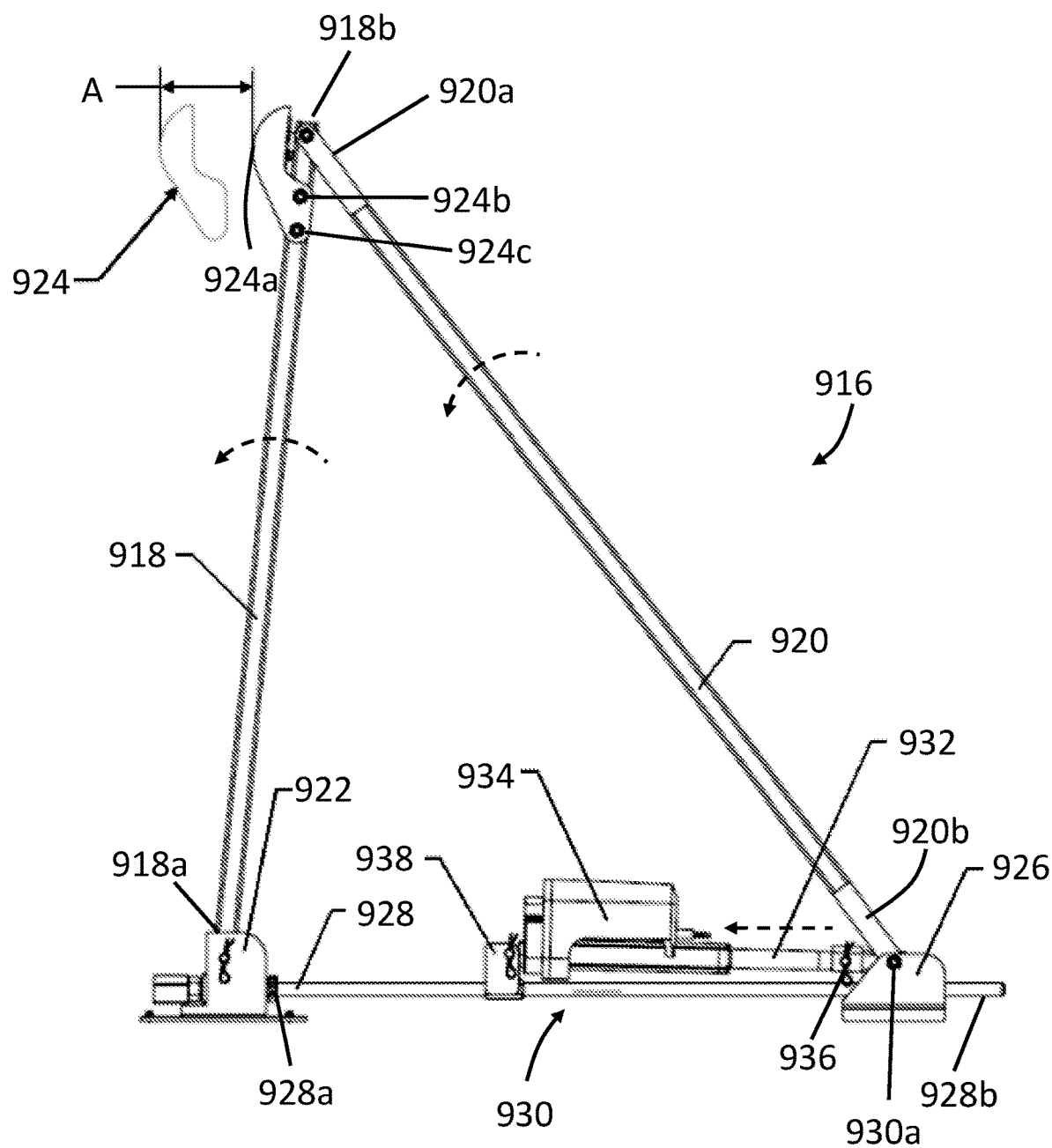
FIG. 34 is an elevational view the tensioning mechanism of FIG. 33A in a disengaged position, similar to FIG. 32A.

Referring to FIGS. 33A, 33B, and 34, the tensioning mechanism 916 includes an A-frame structure comprising a first or vertical upright 918 pivotally connected to a second or angled upright 920 forming a generally triangular, A-frame shape. A proximal end 918a of the vertical upright 918 is pivotally connected to an upright base, first base connection, or anchor base 922 that is fixed in a generally stationary position to a portion of the flatbed trailer 104 or the guide rail 180. A distal end 918b of the vertical upright 918 includes a tarp engagement member or engagement assembly 924, in the form of at least one blade or plate structure having a curved engagement end 924a that contacts the hook plate 912. As shown in FIGS. 31B and 32B, the engagement assembly 924 may include two spaced apart blade structures so that one assembly can be mounted on either side (left or right) of the bow assembly 900. The angled upright 920 is pivotally attached to the distal end 918b of the vertical upright 918. As shown in the illustrated embodiment, the angled upright 920 includes a yoke 920a, part of a distal end of the angled upright 920, that pivotally engages the distal end 918b of the vertical upright 918, though other connections such as, for example, offset ends of the uprights 918 and 920 may be provided. A yoke 920b is provided at a proximal end of the angled upright 920 and pivotally attached to a second base connection or slide base 926 that is mounted for linear movement relative to the trailer bed 104.

A first adjustment actuator or threaded member 928, illustrated as a threaded rod, is axially retained and mounted for rotation on the anchor base 922 at a proximal end 928a. The proximal end 928a is illustrated as terminating in a hexagonal driver configured to cooperate with a handle or wrench for manual operation of the tensioning mechanism 918. In one aspect, the threaded member can be an Acme or power screw element. A distal end 928b freely extends through the slide base 926, though it may be supported by the slide base to prevent damage from contact or abrasion with surrounding componentry. In the illustrated embodiment, the threaded member 928 does not directly engage the slide base 926 for relative rotational movement or axial movement. A second adjustment actuator or actuator assembly 930, including a linear ram 932 and a drive motor 934, is pivotally mounted to the slide base 926 at a proximal end 930a. The actuator assembly 930 may be any mechanism that linearly extends and retracts the proximal end 930a relative to the distal end 930b, such as, for example, a hydraulic ram or threaded rod. In the illustrated embodiment, an actuator extension 936 provides the pivotal connection to the slide base 926 and permits removal and reassembly of the actuator assembly 930 without the need to disassemble the entire tensioning mechanism in the event of a power or component failure.

The actuator assembly 930 is pivotally mounted to a threaded nut, threaded carrier, or actuator base 938 at the distal end 930b. The actuator base 938 threads onto the threaded member 928 and is configured to move axially when the threaded member is manually rotated and configured to remain in a set axial position during powered operation by the ram 932 and drive motor 934. The actuator base may also include a quick release mechanism, such as a pin or bolt, to permit pivotal movement and easy removal of the actuator mechanism from the tensioning mechanism. A locking member 940 may be provided to prevent inadvertent movement of the threaded member 924 relative to the actuator assembly 930. The locking member 940 may be spaced apart lock collars or nuts on either side of the actuator base or may be a set screw or other releasable lock connected between the actuator base and the threaded member.

Referring to the illustrated embodiment of FIG. 33B, the engagement assembly 924 is secured to the vertical upright 918. In one embodiment, the engagement assembly may be rigidly fixed to the vertical upright. As shown in the illustrated embodiment, the engagement assembly 924 may be mounted by at least one pivot point 924b and may also include a pivot travel limit mount 924c when the engagement assembly is connected to a load sensor 942. The engagement assembly 924 is illustrated as two blades assembled on either side of the vertical upright 918 and a load transfer bar 944 spanning between the blades. The load sensor 942 contacts the load transfer bar 944 on one side and the distal end 918b of the upright 918 on the other side. As the curved surface 924a of the engagement assembly 924 contacts the hook 912, the load sensor 942 is compressed by the distal end 918b to generate a signal proportional to the force applied to the sliding bow 902. This signal is also indicative of the tension level applied to the tarp fabric. A feedback loop between a controller, the drive motor 934 of the actuator assembly 930, and the load sensor 942 provides the ability to control the tension applied to the tarp fabric. The load sensor 942 may also provide a signal to a gage or indicator light to monitor the tension when operated in a manual mode. In certain embodiments, the load sensor 942 may be replaced by or mounted with a resilient element, such as a coil spring or rubber element, to modulate the tension applied to the tarp.

In operation, the tensioning mechanism 916 stretches and tensions a tarp (no shown) attached to the front bow 120, any applicable intermediate bows 122, and the rear sliding bow assembly 902 of the rolling tarp assembly. When the tarp (not pictured) and bows are in a fully deployed state extending along the length of the flatbed trailer 104 and the tensioning mechanism 916 is in the engaged position, as shown in FIGS. 31A and 31B, the tarp is fully tensioned. When the tensioning mechanism 916 is moved to the disengaged position, shown in FIGS. 32A, 32B, and 34, the tarp and sliding bows can be retracted to access the flatbed, as shown in FIG. 1. In this condition, the curved engagement end 924a of the engagement assembly 924 has separated from the hook plate assembly 912, allowing the various bows to compress and the tarp to become relaxed.

Figure 35:
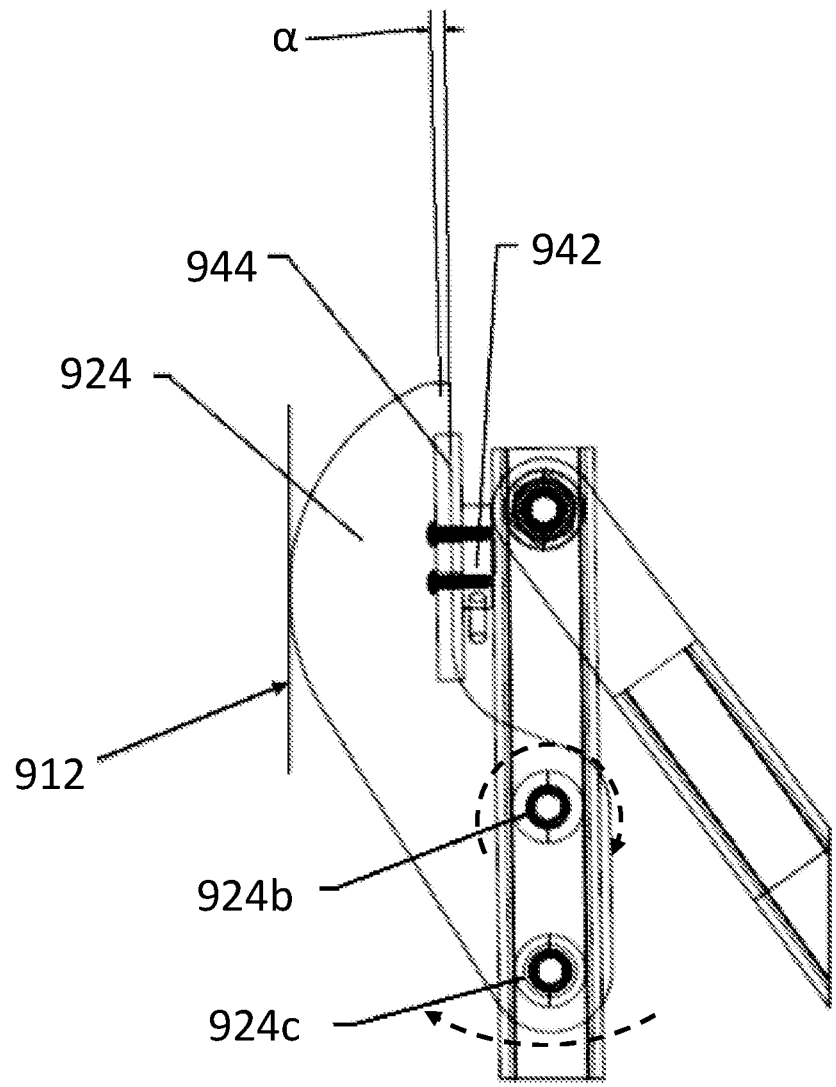
FIG. 35 is an enlarged, elevation view of the engagement portion of the tensioning mechanism of FIG. 34 showing a load measuring sensor.

With the bow assemblies and tarp deployed along the trailer base, the blade 924 of the tensioning mechanism 916 is positioned to contact the hook plate 912. As the actuator assembly 930 is operated electrically by the drive motor 934, the ram 932 connected to the slide base 926 retracts. The operation of the actuator assembly may be localized to the vicinity of the actuator assembly and/or may be remote controlled. This movement causes the angled upright 920 to drive the engagement assembly 924 and the vertical upright 918 to pivot relative to the anchor base 922. As shown in FIG. 34, the blade 924 moves through a distance A from the disengaged position to the engaged position, shown schematically in FIG. 35. The curved surface 924a of the engagement assembly contacts the hook plate 912 as shown in FIGS. 31A, 31B, and 35. As the ram 932 continues to retract, the load applied from the blade 924 to the hook plate 912 moves the rear bow (or front bow or both, if using front and rear mounted tensioning mechanisms) rearward on the flatbed and stretches the tarp. The load applied to the hook plate and tarp is measured by the load sensor 942. The blade 924 is pivotally mounted on the distal end 918a of the vertical upright by the pivot point 924b and the pivot travel limit mount 924c, as shown in FIG. 35. This permits the sensor to better detect the applied forces to the tarp as the intermediate member between the force generated from the A-frame structure and the contact of the blade and hook plate. Additionally, the pivotal movement of the blade and the curved surface contact provides an improved load transfer and more accurate load sensing during the transport operation to maintain the desired tension on the tarp. As the truck is driven, road disturbances, vibration, and tarp age and elasticity cause the tarp tension to vary. The load cell provides a continuous sensing and periodic adjustment of the forces applied by the blade to the hook plate to maintain the desired tension on the tarp. In certain embodiments, one compression load sensor 942 is used, which may be mounted on either of the side A-Frames. On the non-sensed side, the load sensor may be replaced by a metal spacer. Alternatively, each side may have a load sensor or the load may be sensed directly on the tarp. In certain embodiments, the load cell 942 may be configured as a torque sensor or torque cell within or coupled to the actuator assembly 930 to generate load related data for a controller to adjust and maintain the tarp tension. Alternatively, the current draw of the motor 934 can be measured as a function of torque resistance which is proportional to the tarp tension.

In the event of a power or actuator failure, the ram of the actuator assembly will be positioned in a fixed length. The proximal end 928a of the threaded member 928 may include a torque transmitting profile, such as a hexagonal boss, that can be engaged with a crank handle or socket wrench to permit manually cranking of the threaded member 928. As the threaded member 928 is turned manually, it rotates relative to the threaded carrier 938 causing the fixed length ram 932 to move axially. This axial movement opens or closes the A-frame structure causing the tensioning mechanism to move to the engaged or disengaged positions depending on rotation direction.

The principle and mode of operation of this invention have been explained and illustrated in its preferred embodiments. However, it must be understood that this invention may be practiced otherwise than as specifically explained and illustrated without departing from its spirit or scope. It is further understood that any particular element of one embodiment may be applied in combination with other embodiments and remain within the scope of the invention.

What is claimed is:

1. A tarp tensioning mechanism comprising:
   a first base connection fixed to a mounting surface and a first upright member pivotally attached to the first base connection;
   a second base connection slidably supported on the mounting surface and a second upright member pivotally attached to the second base connection, the second upright member pivotally attached to the first upright member;
   a tarp engagement member carried by one of the first or second upright members; and
   a tensioning actuator comprising:
   a first adjustment actuator configured to rotate relative to the first base connection, the first adjustment actuator axially fixed to the first base and axially movable relative to the second base connection; and
   a second adjustment actuator connected between the first adjustment actuator and the second base connection, the second adjustment actuator configured for motorized movement of the second base connection relative to the first base connection and the first adjustment actuator configured for manual movement of the second base connection relative to the first base connection.

2. The tarp tensioning mechanism of claim 1 wherein the tarp engagement member is pivotally carried by the first upright member.

3. The tarp tensioning mechanism of claim 2 wherein a load sensor is positioned between the tarp engagement member and the first upright member such that movement of the tarp engagement member relative to the first upright member is transmitted as a load measurement to a controller, the controller configured to control the second adjustment actuator to maintain a tension level of a tarp assembly.

4. The tarp tensioning mechanism of claim 1 wherein the mounting surface is one of a flatbed trailer, a trailer bed, or a guide track.

5. The tarp tensioning mechanism of claim 1 wherein the first adjustment actuator is a threaded rod and the second adjustment actuator is in threaded engagement with the first adjustment actuator.

6. The tarp tensioning mechanism of claim 5 wherein the second adjustment actuator is pivotally connected to the first adjustment actuator and the second base connection.

7. The tarp tensioning mechanism of claim 1 wherein a tarp tensioning load applied by the tarp engagement member to a tarp bow assembly is measured and the second adjustment actuator is operated to adjust and/or maintain the tarp tensioning load.

8. The tarp tensioning mechanism of claim 7 wherein the tarp tensioning load is measured by one of a load cell, torque cell, or a motor current draw and a controller operates the second adjustment actuator to maintain the tarp tensioning load.

9. The tarp tensioning mechanism of claim 1 wherein a load sensor is coupled to the tarp engagement member such that a load applied from the tarp engagement member relative to the first upright member is transmitted as a load measurement to a controller, the controller configured to control the second adjustment actuator to maintain a tension level of a tarp assembly.

10. A tarp tensioning mechanism comprising:
    a first base connection fixed to a mounting surface and a first upright member pivotally attached to the first base;
    a second base connection slidably supported on the mounting surface and a second upright member pivotally attached to the second base, the second upright member pivotally attached to the first upright member;
    a tarp engagement member carried by one of the first or second upright members; and
    a tensioning actuator having a first end held in a selectively adjustable position relative to the first base connection and comprising a drive motor and a ram, the ram connected to the second base connection, the tensioning actuator configured for motorized movement of the second base connection relative to the first base connection and wherein a tarp tensioning load applied by the tarp engagement member to a tarp bow assembly is measured and the ram is operated to adjust and/or maintain the tarp tensioning load.

11. The tarp tensioning mechanism of claim 10 wherein the first end is configured as a threaded nut that engages a threaded rod that is supported for rotation relative to the first base connection and supported for axial movement relative to the second base connection.

12. The tarp tensioning mechanism of claim 11 wherein the threaded rod is rotatable for axial movement of the tensioning actuator relative to the first base connection.

* * * * *